United States Patent [19]

Brody et al.

[11] Patent Number: 4,670,899
[45] Date of Patent: Jun. 2, 1987

[54] LOAD BALANCING FOR CELLULAR RADIOTELEPHONE SYSTEM

[75] Inventors: George C. Brody, Dallas; Francis K. Ma, Plano; Robert C. Nissen, Richardson, all of Tex.; Theodore Taylor, Lynchburg, Va.; Raju Patel, Plano; Craig A. Ziesman, The Colony, both of Tex.

[73] Assignees: Northern Telecom Limited, Montreal, Canada; General Electric Co., Lynchburg, Va.

[21] Appl. No.: 739,882

[22] Filed: May 31, 1985

[51] Int. Cl.[4] .............................................. H04B 1/00
[52] U.S. Cl. ...................................... 379/60; 379/39; 455/33; 455/56
[58] Field of Search ................. 179/2 EB, 2 E, 2 EA, 179/2 ESS; 455/33, 56

[56] References Cited

U.S. PATENT DOCUMENTS

| | | | |
|---|---|---|---|
| 3,663,762 | 5/1972 | Joel, Jr. ................................. | 455/33 |
| 3,764,919 | 10/1973 | Cox et al. ............................. | 325/53 |
| 3,898,390 | 8/1975 | Wells et al. ........................... | 455/33 |
| 4,125,808 | 11/1978 | Graham ................................ | 325/55 |
| 4,127,744 | 11/1978 | Yoshikawa et al. ................. | 179/2 EB |
| 4,144,411 | 3/1979 | Frenkiel ................................ | 179/2 EB |
| 4,144,412 | 3/1979 | Ito et al. ............................... | 179/2 EA |
| 4,144,496 | 3/1979 | Cunningham et al. .............. | 455/33 |
| 4,187,398 | 2/1980 | Stark .................................... | 179/2 EB |
| 4,228,319 | 10/1980 | De Jager et al. .................... | 179/2 EB |
| 4,242,538 | 12/1980 | Ito et al. ............................... | 179/2 EB |
| 4,308,429 | 12/1981 | Kai et al. .............................. | 179/2 EB |
| 4,347,625 | 8/1982 | Williams .............................. | 455/17 |
| 4,360,927 | 11/1982 | Bowen et al. ....................... | 455/17 |
| 4,384,362 | 5/1983 | Leland .................................. | 455/33 |
| 4,398,063 | 8/1983 | Hass et al. ........................... | 179/2 EB |
| 4,435,840 | 3/1984 | Kojima et al. ....................... | 455/33 |
| 4,475,010 | 10/1985 | Huensch et al. ..................... | 179/2 EB |
| 4,573,206 | 2/1986 | Grauel et al. ........................ | 455/33 |
| 4,612,415 | 9/1986 | Zounek et al. ...................... | 179/2 EB |

OTHER PUBLICATIONS

Performance Modelling for an Antomated Public Mobile Telephone System, R. N. Pandya and D. M. Brown, G6 3.1–G6 3–6.
Traffic Modelling of a Cellular Mobile Radio System Bell Northern Research Oscan Avellaneda, Raj Pandya, George Brody, pp. 1–22.
Application of Digital Switching in a Cellular Mobile Radio System, Brody Patel, Rowland, BNR Northern Telecom Bell Canada.
IEEE Vehicular Technology Conference, Pittsburgh, Pa., May 1984, DMS MTX Turnkey System for Cellular Mobile Radio Publication, Francis K. Ma and Sam Chua.
EIA Interim Standard Cellular System Mobile Station–Land Station IS–3–B, Jul. 1984, A–49.
ISO Data Communication–High Level Data Link Control Procedures–Elements of Procedures–Elements of Procedures, pp. 1–28, 1979.

Primary Examiner—Robert Lev
Attorney, Agent, or Firm—Nixon & Vanderhye

[57] ABSTRACT

Balancing of loading of cells in a cellular mobile radio telephone system is performed by periodically determining the channel utilization of each cell, computing a representative voice channel occupancy level, and attempting to hand-off calls from cells with higher voice channels occupancy levels to adjacent cells with lower voice channel occupancy levels. Voice channel occupancy levels of cells are measured and compared with threshold values, and the results of the comparisons are used to direct cells to enter predetermined states. In one state, complete cell blockage is prevented by directing cells to hand-off calls to adjacent cells. In another state, voice channels are preserved for incoming hand-offs by directing the cell to deny access to mobile transceivers initiating new calls. Cells may assume a combined stage wherein both of these functions are performed simultaneously. Cells are selected as hand-off candidates for hand-offs initiated to more evenly distribute loading throughout the cellular system in accordance with cell state (i.e., voice channel occupancy level) and measured signal strength at the cells of the calls attempted to be handed off.

25 Claims, 20 Drawing Figures

"NORMAL" MESSAGE

"DIRECTED HANDOFF" MESSAGE

"DIRECTED RETRY" MESSAGE

"COMBINED" MESSAGE

"HANDOFF REQUEST MESSAGE"

LEGEND
△ - AVERAGE CELL BLOCKING (REGULAR CALLS)
X - OVERALL SYSTEM BLOCKING
☐ - PROB. THAT A H/O ATTEMPT WAITS

LEGEND
△ - WITHOUT LOAD SHARING
X - WITH LOAD SHARING

LOAD BALANCING FOR CELLULAR RADIOTELEPHONE SYSTEM

FIELD OF THE INVENTION

The present invention is related to cellular radio communication systems, and more particularly, to techniques for using radio frequency spectrum and hardware resources in a cellular mobile radiotelephone communications systems more efficiently and in a manner which improves system reliability.

BACKGROUND OF THE INVENTION

Cellular mobile radiotelephone systems, a recently-developed technology useful for public mobile telephone service, can provide service quality and features comparable to those provided by the Public Switched Telephone Network (PSTN) for a large number of mobile users. Cellular radiotelephone systems are capable of using the same radio frequency (rf) communications channel for communications by multiple users (geographically separated from one another) independently and on a non-interfering basis, and thus use the portion of the radio frequency spectrum available for radiotelephone communications far more efficiently than ever before. However, the ever-increasing demand for radiotelephone communications service makes techniques permitting still more efficient use of rf spectrum and equipment resources extremely valuable.

Before cellular radiotelephone systems came into wide use, single high-power repeater stations were typically used to provide mobile-to-mobile and mobile-to-land communications. In such systems, a single repeater station is often located in a centralized position of high elevation within a predetermined geographical area to be serviced. All communications within the service area are routed directly through the repeater. The repeater typically provides full duplex communications simultaneously and independently over a plurality of fixed-frequency communications channels. Mobile stations within the repeater's service area can access the repeater to communicate with any other mobile station within the service area or to establish communications with a land line (i.e., conventional telephone line) coupled to the repeater. The repeater also is typically capable of calling a mobile station and initiating communications with the called station in response to control by a central dispatch operator or in response to signals received by the repeater from a land line. Fixed-frequency channels are allocated to calls using conventional trunking techniques such as those described in U.S. Pat. No. 4,360,927 to Bowen et al (1982) and U.S. Pat. No. 4,347,625 to Williams (1982). This type of communications system is extremely useful due to its flexibility and relatively low cost.

While systems of the type described above are very useful for servicing areas in which there are relatively few mobile stations or in which the users' demands are relatively low (e.g., due to the nature of the communications being conducted), system performance may be adversely affected as call traffic (volume) increases. The number of conversations capable of being sustained simultaneously with a single repeater-type system is equal to the number of repeater channels available for communications. Channel blocking can occur during periods of peak usage even using a repeater provided with a relatively large number of repeater channels (e.g., 20 or more), degrading system reliability and causing great frustration to users who attempt to initiate communications only to find that all channels are already in use. Allocation of additional repeater channels can reduce blocking potential but is sometimes not possible in congested metropolitan areas where many other services compete for available spectrum space.

Cellular mobile radiotelephone communications systems avoid the limitation of a one-to-one correspondence between the number of available channels and the number of independent conversations capable of being sustained simultaneously by re-using channels already in use in one portion of the service area on a non-interfering basis in another portion of the service area. Cellular systems divide a large service area into a number of smaller discrete geographical areas called cells (zones) each typically ranging in size from about 2 to about 20 kilometers in diameter. Each cell is contiguous with adjacent cells to provide continuous coverage throughout the service area. Each of the cells is served by a base station installation ("base station") including plural low-power transceivers which are capable of operating independently on different radio frequency (RF) channels. Each of the cell site base station installations is thus capable of participating in communication simultaneously with plural mobile radio transceivers operating within the associated cell. The cell site base stations also communicate via a data link (and voice trunks) with a central control station called a Mobile Telephone Exchange (MTX) the function of which is to selectively connect cell voice trunks to other cell voice trunks and/or to land lines and to coordinate activities of the cells.

FIG. 1 is a schematic representation of the geographical layout of a mature 13-cell cellular system 10. System 10 includes 13 cells C1 through C13 each having a cell site base station (T1–T13, respectively) associated therewith (each base station including at least one base station transceiver). System 10 may be considered an isolated piece of a larger system which has been fragmented. The contour or boundary of each cell is defined as a circle along which the received radio signal strength of signals transmitted by the cell site transceiver is equal to a predetermined minimum signal threshold. Such "bad service" contours characterize the minimum received signal strength indicator (RSSI) required to maintain adequate service within the cells.

Mobile radio transceivers within the contour of a cell can participate in communications of acceptable quality with the cell site base station associated with that cell (i.e., a minimum desired signal-to-noise ratio without excessive signal fading is maintained throughout the geographical area defined within the cell contour). The cell site contour may thus be considered dependent upon cell site transceiver effective radiated output power (erp) and mobile transceiver receiving sensitivity (as limited by cell site transceiver receiving sensitivity and mobile transceiver output power). Mobile transceiver output power may be selected so that the contour also corresponds to the signal strength of signals received by the cell site transceiver (i.e. the cell contours may also represent the area a transmitting mobile transceiver must be operating within for the cell site transceiver to receive the signals transmitted by the mobile transceiver at useful signal strengths). In this way, the range of the mobile transceivers may be made to correspond to the range of the cell site transceivers to avoid waste of resources and undue co-channel interference.

Cell site installations T1–T13 are positioned relative to one another such that there is a degree of overlap between contiguous cells. Hence, for instance, a mobile transceiver positioned in the area 15 of overlap between contiguous cells C5, C6 and C12 of system 10 could participate in communications with transceivers of any one of cell site base stations T5, T6 and T12. Some degree of overlap is important to permit transfer of calls from one cell to another, as will become more apparent shortly.

The great power and flexibility of cellular system 10 results in part because transceivers of cell site base stations T1–T13 may operate independently and on a non-interfering basis on the same RF channel (frequency). For instance, a mobile transceiver M1 located in cell C9 may communicate with a transceiver of cell site base station T9 via a communications channel X1 while, at exactly the same time, another mobile transceiver M2 located in another cell (for example cell C11) may communicate with a transceiver of associated cell site base station (T11) via the same communications channel X1 (i.e. the same frequencies are used for each call). Because cells C9 and C11 are geographically separated from one another (e.g., they do not overlap), the transmissions of mobile transceiver M1 and cell site base station T9 will not interfere with the communications between mobile transceiver M2 and cell site base station T11, and vice versa. The same channel X1 could also simultaneously be used in several other cells of system 10 so long as such other cells do not overlap the cells C9 and C11 in which the channel is already in use (for example, channel X1 might also simultaneously be used in cells C12, C13, C8, C1, C7 or C6, or even in combinations of such cells such as cells C8 and C1, cells C12 and C7, etc.). In this way, cellular system 10 is capable of handling many more independent conversations (calls) simultaneously than could a single repeater-type system allocated the same number of channels.

The coverage range and capacity of cellular system 10 is potentially unlimited. Additional cells may be added to increase the size of the area served by system 10. Moreover, existing cells can be split or sectored (e.g. by providing additional cell site transceivers coupled to omni-directional or directional antennas) to accommodate additional communications traffic within particular cells. The frequency reuse concept (whereby the same set of frequencies can be used virtually independently in non-contiguous cells) as well as the flexibility of accommodating increased traffic demands through cell splitting or cell sectoring has made cellular mobile radio systems the radiotelephone system of choice in North America as well as in Europe and Japan. The following references provide additional general background information concerning cellular radio systems and techniques:

U.S. Pat. No. 4,398,063 to Hass et al (1983);
U.S. Pat. No. 4,308,429 to Kai et al (1981);
U.S. Pat. No. 4,242,538 to Ito et al (1980);
U.S. Pat. No. 4,127,744 to Yoshikawa et al (1978);
U.S. Pat. No. 3,663,762 to Joel, Jr. (1972);
U.S. Pat. No. 4,125,808 to Graham (1978);
Brody et al, "Application of Digital Switching in a Cellular Mobile Radio System", International Switching Symposium (May 7–11, 1984, Florence, Italy);
Ma et al, "DMS-MTX Turnkey System For Cellular Mobile Radio Application", Institute of Electrical and Electronic Engineers 1984 Vehicular Technology Conference (May 21–23, 1984, Pittsburgh, Pa.);
Pandya et al, "Performance Modelling for An Automated Public Mobile Telephone System", International Communications Conference (June 13–17, 1982, Philadelphia); and
EIA IS-3-B Interim Standard Cellular Mobile Station-Land Station Compatibility Specification (July, 1984).

Although some mobile transceivers served by system 10 may always remain in the same cell, it is generally desirable to provide continuous communications for mobile transceivers in transit between any two arbitrary points within the geographical area served by system 10. For instance, mobile transceiver M1 may belong to a business executive having a home located in cell C9 and an office located in cell C6 who wishes to use his or her mobile transceiver while commuting between home and the office. A conversation may be initiated while mobile transceiver M1 is in cell C9, but may continue as the mobile transceiver exits cell C9 and moves through, for example, cells C2, C1, C7 to finally reach a destination within cell C6. As mobile transceiver M1 approaches the "bad service" contour of cell C9, system 10 must somehow transfer ("hand-off") the ongoing communications to the new cell the mobile transceiver has entered or is about to enter (such as cell C2) if the conversation is to be continued. Overlapping of adjacent cells makes it possible for such hand-offs to occur without interrrupting the call being handed-off (since a mobile transceiver is typically in more than one cell at once when approaching the "bad service" contour of a cell). It is important that such hand-offs are accomplished very rapidly and reliably if conversations are to continue without interruption as mobile transceivers exit one cell and enter another.

A central mobile telephone exchange (MTX) (not shown) of system 10 supervises the cell site base stations T1–T13 to allow calls in progress to continue without interruption when mobile stations move from one cell to another. When a mobile transceiver participating in a call is about to exit a cell, the MTX automatically hands off the call to a free channel in an adjacent cell into which the mobile transceiver has moved (mobile transceivers can be in two or more cells simultaneously due to the overlap between cells). Cell site base stations typically continuously measure indication of received signal strength (RSSI) for each ongoing call and request the MTX to hand-off a call when the RSSI of the call falls below a predetermined threshold.

The cell to which the call is handed off may be selected in accordance with a voting process initiated by the MTX at the time the MTX is notified the RSSI in the transferor cell (the cell from which a hand-off is necessary) has dropped below the predetermined threshold. The MTX may at that time direct the cell site base stations of the cells adjacent to the cell serving the call (e.g., base stations T10, T3, T2 and T8 if cell C9 is serving the call) to monitor the strength of the signal transmitted by the mobile transceiver on the channel in use (monitoring receivers may be provided at each cell site solely for this monitoring purpose, or receivers of unused cell site transceivers may be used). The MTX typically receives the RSSI information back from the adjacent cells and orders cells by signal strength intensity. The MTX may select the cell in which the highest signal level was received and, if a service channel is available in that cell, the MTX may direct the mobile transceiver through the first cell to begin operating on that available service channel. If a service channel is not available in the cell determined as having the highest received signal level, other cells with received signal levels above a predetermined minimum threshold may be checked for available service channels until a new service is located and allocated to the call. If no service channel is available after all possible cells have been checked, the call cannot be handed-off and the mobile transceiver may be signalled accordingly (in which case the mobile transceiver operator must either quickly complete his call or halt his vehicle before it exits the cell it is presently in).

A description of this intercell hand-off technique is found in, for example, U.S. Pat. No. 3,898,390 to Wells et al (1975). A variation on the Wells et al hand-off technique is disclosed in U.S. Pat. No. 4,475,010 to Huensch et al (1984), which describes a hand-off technique wherein cell sites themselves perform hand-offs in order to conserve MTX processing resources. When a signal from a specific mobile unit associated with a controlling cell site in the Huensch et al system drops below a prespecified threshold, the controlling cell site itself selects the group of nearby cell sites which are to measure the signal strength of transmission on the radio channel currently being used by the mobile unit. The MTX simply passes signal strength measurement request messages from the requesting cell site to each cell site in a list of nearby cell site addresses identified by the controlling cell site. The controlling cell site uses the signal strength reports and antenna/channel availability (also provided by the addressed cell sites) to generate a list of cell sites which are candidates for a hand-off. The controlling cell site further detects when the signal from a specific mobile unit drops below a second prespecified threshold, and selects a more limited list of nearby cell sites which are to measure received signal strength if this occurs.

As mentioned above, it may sometimes be desirable to direct a cell other than the one registering the highest received signal strength to handle a hand-off. For instance, U.S. Pat. No. 4,144,412 to Ito et al (1979) describes a cellular radio system having overlapping cells. When communications is to be established with a mobile station, the mobile station transmits a call signal over a control channel receivable by each of the cell site transceivers. The installations at each cell site measure the call signal strength, and the cells are ordered in accordance with received signal strength. A search is then made to determine if the cell site base station which received the signal of maximum intensity has a channel free to handle a call. If such an idle channel exists, information designating the idle channel is transmitted to the mobile station and communication is established between the cell receiving the highest signal strength and the mobile station. On the other hand, if the search for an idle channel reveals that the cell site base station which received the signal having the maximum intensity has no available channels, it is determined whether the cell site base station receiving the next strongest signal intensity has a channel available for communications. If this second cell site installation likewise has no available channels, a third cell site base station having the next highest received signal strength is checked to determine if it has an available channel. The number of searches and designations to be repeated is determined in accordance with the intensity of the received signal, the degree of congestion of the communications and other conditions.

A vehicle in a congested cell may thus be included in an adjacent cell by designating a communications channel of a cell which has received a signal having an intensity next to maximum, with the result that the equivalent area of the congested cell is effectively narrowed and the area of the cell adjacent to the congested cell is effectively increased. Even when the channels of a cell site in which a calling vehicle is located are all busy, it is possible to complete a call by using an idle channel assigned to an adjacent cell, thereby decreasing the number of call failures, increasing the quantity of traffic which can be handled, and improving the efficiency of channel utilization.

U.S. Pat. No. 4,435,840 to Kojima et al (1984) discloses a somewhat similar technique in which cell size is not merely effectively, but actually selectively enlarged or reduced (e.g., by controlling the output power of the cell site transceivers) in accordance with a value representing current or instantaneous volume of traffic handled by the cell (i.e., a utilization factor of equipment of each cell site base station). If the traffic in a first cell is much greater than the traffic in an adjacent cell, the size of the first cell is reduced and the size of the second cell is increased (by adjusting cell site transceiver and/or mobile transceiver power outputs and/or receiver sensitivities) to permit the adjacent cell to handle traffic which the first cell would otherwise have been expected to handle.

U.S. Pat. No. 4,144,496 issued to Cunningham et al (1979) discloses an adaptive channel assignment technique for use in a cellular radio system having cell site transceivers which are remotely tunable by the MTX. Each cell site transceiver may be selectively tuned to any one of the frequencies allocated to the system under MTX control. Additional transceivers are provided at cell sites to permit shifting of channels from cell to cell as needed to accommodate heavier traffic loading in busier cells by diverting channels from lightly loaded cells. An algorithm designed to minimize interference is used to control the channel assignments.

U.S. Pat. No. 3,764,915 to Cox et al (1973) is also of interest in disclosing a cellular radio system wherein an MTX dynamically allocates communication channels in response to requests for channels by mobile users. The determination of the channel which should be allocated is made in accordance with channel re-use and allocation optimization criteria to insure that it is the preferred allocation from the standpoint of desired system performance. More particularly, channels are allocated to cells on the basis of close spatial proximity to the requesting mobile transceiver, relative velocity of the mobile transceiver, etc. in order to prevent co-channel interference and to avoid "wasting" channels by uneconomically assigning them.

SUMMARY OF THE INVENTION

Known cellular systems use communications channels very efficiently, but are nevertheless subject to cell blocking during periods of high demand (when cells may have not free channels available for handling new calls or call hand-offs). Because traffic distribution in system 10 is variable and, to a large extent unpredictable, it is possible for some cells to become completely "blocked" (i.e., fully occupied without capacity to handle any additional calls) while nearby cells remain only lightly loaded. This condition results in decreased system performance, since blocked cells cannot be used to handle new calls or to act as transferees for calls being handed off.

In accordance with the present invention, loading of cells is dynamically redistributed by selectively transferring ongoing calls to adjacent cells in accordance with traffic level in order to reserve channels for handoffs and for new calls. Communications is established between a first set of mobile radio transceivers contained within a first predetermined geographical area (cell) and a subset of a first plurality of stationary radio transceivers serving the first area. A channel occupancy level for the first geographical area (indicating the number of the first plurality of stationary transceivers which are in communication with a mobile radio transceiver with respect to the number of the first plurality of stationary transceivers not in communications with a mobile transceiver) is periodically determined. If the channel occupancy level exceeds a predetermined threshold level, at least one call is transferred from a stationary transceiver serving the first geographical area to a stationary radio transceiver serving another predetermined geographical area overlapping the first area and also containing the mobile transceiver.

The channel occupancy level associated with the first geographical area may be compared with a first predetermined threshold level DTHRESH. A state associated with the first geographical area is set to a first predetermined value if the channel occupancy level exceeds the first threshold level, and is set to a second predetermined value if the channel occupancy level is less than the first threshold level. If the channel occupancy level exceeds the first threshold level, the number of communications between the subset of stationary radio transceivers serving the first area and engaged in communications with mobile transceivers which must be transferred to decrease the channel occupancy level to below the first threshold value is calculated, and the number of communications so calculated is transferred to plural stationary radio transceivers serving the other area.

Channel occupancy level may also be compared to a second predetermined threshold value DRTHRESH. If the channel occupancy level exceeds the second threshold value, the state associated with the first area is set to a third predetermined value and any available stationary transceivers serving the first area are not permitted to accept new communications (thus reserving them for use as transferees of ongoing calls).

BRIEF DESCRIPTION OF THE DRAWINGS

These and other features of the present invention will be more readily understood by reading the following detailed description taken in conjunction with the accompanying drawings, of which.

DETAILED DESCRIPTION OF THE PREFERRED EMBODIMENT

Figure 2:
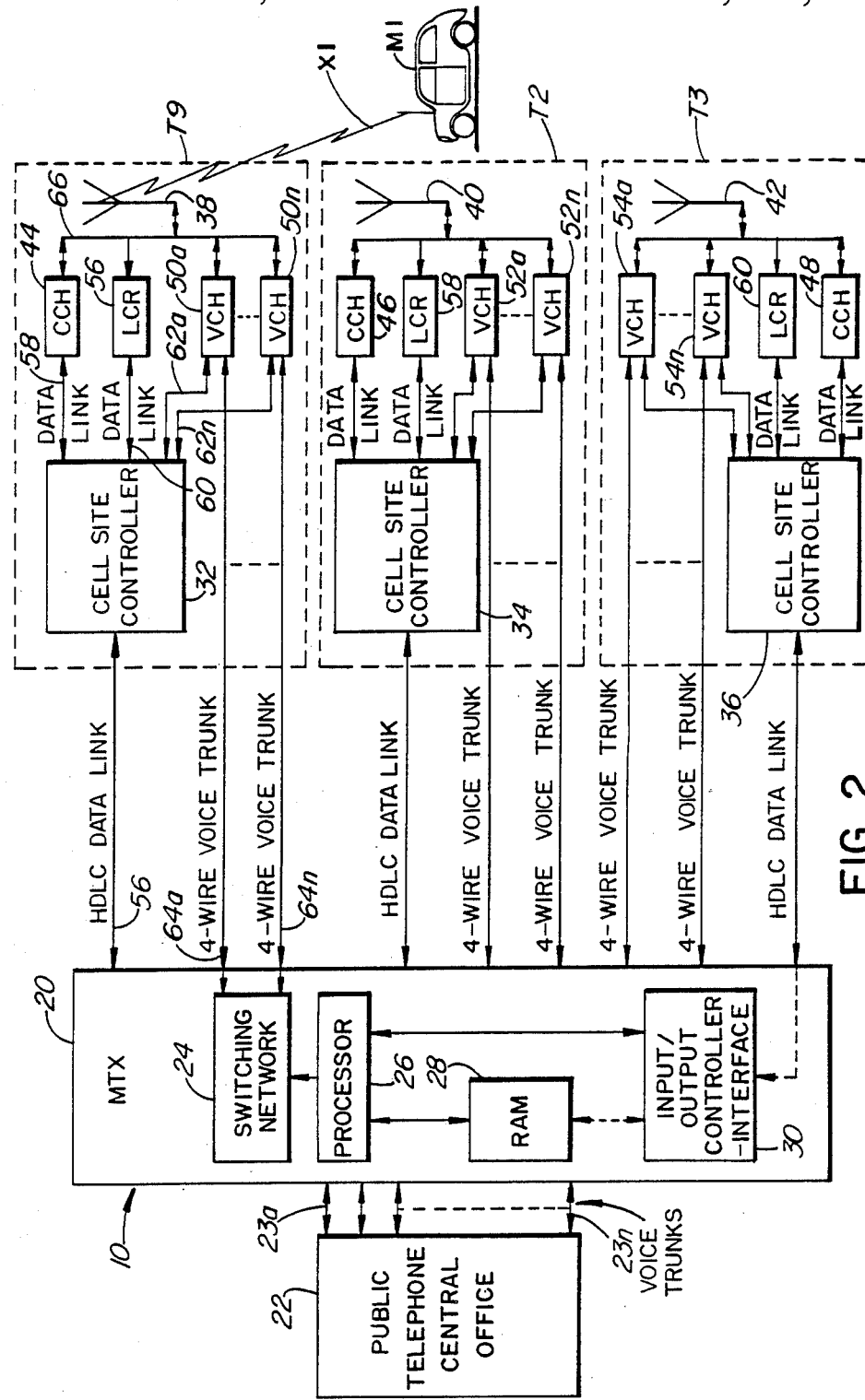
FIG. 2 is a schematic block diagram of the presently preferred exemplary embodiment of a cellular mobile radiotelephone system in accordance with the present invention.

FIG. 2 is a schematic block diagram of the presently preferred exemplary embodiment of a cellular mobile radio telephone system 10 in accordance with the present invention. System 10 includes a mobile telephone exchange (MTX) 20, a public telephone central office 22, a plurality of cell site base stations (e.g., T9, T2, T3) and a plurality of mobile radio transceivers (only one transceiver M1 is shown). Public telephone central office ("central office") 22 is a conventional telephone exchange providing communications to a plurality of hard-wired telephones via conventional land lines. Central office 22 is accessible by MTX 20 via a plurality of voice trunks 23a–23n. Telephone calls may be initiated by MTX 20 and handled by central office 22, or may be initiated by the central office (e.g., by telephones connected to the central office) and directed to the MTX. Central office 22 and voice trunks 23a–23n thus permit system 10 to establish communications between mobile transceivers (M1) and conventional land-based communications facilities.

As discussed previously, cell site base stations T9, T2 and T3 are installed at fixed locations separated from one another within a geographical area to be served. Each of the cell site base stations defines a geographical cell (e.g., base station T9 serves cell C9 shown in FIG. 1, base station T2 serves geographical cell C2 shown in FIG. 1, etc.). Cell site base stations T9, T2 and T3 establish bidirectional communications with mobile transceivers within the service area of system 10.

MTX 20 controls the operations of each of cell site base stations T9, T2 and T3, and also selectively routes voice information through system 10. More particularly, voice information is communicated between MTX 20 and each of cell site base stations T9, T2, and T3 via a plurality of 4-wire voice trunk lines in the preferred embodiment (for example, voice trunk lines 64a–64n connect cell site base station T9 with MTX 20). Each of voice trunks 64a–64n are bidirectional signal paths carrying analog voice information (or digitized voice information if appropriate analog-to-digital and digital-to-analog converters are provided). MTX 20 includes a switching network 24 which is capable of selectively connecting any voice trunk line of any cell site base station to any other voice trunk line (of the same or different cell site base station or of central office 22). Switching network 24 operates under control of a processor 26 dedicated to MTX 20. Processor 26 executes programs stored in a random access memory (RAM) 28, which is also available for data storage by the processor.

MTX 20 also includes an input/output controller-interface 30 which permits the MTX to communicate control information to each of cell site base stations T9, T2 and T3 via dedicated high-level data links and associated controllers (for example, a high-level data link 56 connects MTX 20 with cell site base station T9). Such high-level data links are bidirectional signal paths (conventional balanced wire pairs may be used) which communicate control information from MTX 20 to the cell site base station dedicated to the data link and vice versa. In the preferred embodiment, the data communications protocol used to transmit control information via the high-level data links dedicated to cell site base stations T9, T2, and T3 is conventional and is described in "Data Communications-High Level Data Link Control Proc.—Elements of Procedure (Independent Numbering)", International Standard ISO 43 35(1976), which publication is expressly incorporated herein by reference.

Cell site base stations T9, T2 and T3 are identical to one another in structure, and only base station T9 will now be described. Cell site base station T9 includes a cell site controller 32, a control channel transceiver 44, a plurality of voice channel tranceivers 50a–50n, a locating receiver 56 (which may be a transceiver with an unused transmitter section) and an antenna 38. Control information is communicated between cell site controller 32 and transceivers 44, 56 and 50a–50n via data links 58, 60 and 62a–62n, respectively. Cell site controller 32 controls the operations of each of transceivers 44, 56, and 50a–50n via information conveyed over the data links.

Cell site controller 32 itself includes a digital signal processor (e.g., a microprocessor) with some amount of information storage capacity, and an input/output controller (either hardware or software) which communicates information to and from MTX 20 via high-level data link 56. Each of transceivers 44, 56 and 50a–50n include a full-duplex radio transceiving device (i.e., a transceiver and associated receiver capable of operating simultaneously on different frequencies) the input/output of which is connected to shared antenna 38 via a conventional matching/multiplexing network 66 (separate antennas may be used if desired). Cell site controller 32 selects the frequencies at which transceivers 44, 56 and 50a–50n operate under software control (although these frequencies are fixed upon initialization of cell site controller 32 in the preferred embodiment, dynamic frequency allocation under software control is also possible). The frequencies of operation of tranceivers 44, 56 and 50a–50n are selected so that all of these tranceivers may operate simultaneously on a non-interfering basis.

Voice channel transceivers 50a–50n are used by cell site base station T9 to establish voice communications with mobile transceivers within geographical cell C9. For instance, voice channel transceiver 50a may be engaged in communication with mobile transceiver M1 at the same time that voice channel tranceiver 50b is communicating with another mobile transceiver, etc. Thus, the number of mobile transceivers cell site base station T9 is capable of communicating with simultaneously is limited by the number of voice channel transceivers 50a–50n (this number may range from 1 to 72 in the preferred embodiment).

Control channel transceiver 44 is used to transfer control information between cell site controller 32 and each of the mobile radio transceivers operating in cell C9. The exchange of such control information may be conventional and of the protocol and format described in "EIA IS-3-B Interim Standard Cellular System Mobile Station-Land Station Compatability Specification" (July 1984), the entire disclosure of which is hereby expressly incorporated herein by reference.

Briefly, mobile transceivers within cell C9 not actually engaged in voice communications via one of voice channel transceivers 50a50ncontinuously monitor the transmit frequency of control channel transceiver 44 and await a call. If MTX 20 receives a call designating a particular mobile transceiver as the recipient of the call, the MTX will transmit control information (via the high-level data links) to each of the cell site base stations corresponding to the cells in which the called mobile transceiver might be expected to be found (typically, particular mobile transceivers are only authorized to operate in some subset of the cells of system 10). To call a mobile transceiver, cell site controller 32 causes control channel transceiver 44 to transmit a "paging" message which designates the mobile transceiver intended to receive the call by a unique identification code. The mobile transceiver monitors the output frequency of the control channel transceiver 44, and when it receives a call designating it, responds by transmitting access commands over the receive frequency of the control channel transceiver.

Additional hand-shaking back and forth between the called mobile transceiver and the control channel transceiver ensures reliable channel acquisition.

When cell site controller 32 is prepared to dedicate one of voice channel transceivers 50a50n to the called mobile station, the cell site controller transmits indicia of the voice channel frequencies to be used to the called mobile transceiver via control channel transceiver 44 along with a command instructing the mobile transceiver to begin operating on the voice channel. Cell site controller 32 also actuates the one of voice channel transceivers 50a–50n being dedicated to the called mobile transceiver. The mobile transceiver begins operating on the voice channel frequencies indicia of which it received via the control channel, and the new call proceeds. Similar exchanges may be initiated when a mobile transceiver within cell C9 transmits an "origination" message indicating it wishes to make a call. Cell site controller 32 controls all such channel acquisition transactions under the supervision of processor 26 of MTX 20.

As mentioned above, the number of mobile transceivers capable of communicating via any particular cell site base station (e.g., cell base station T9) is limited by the number of voice channel transceivers (e.g., 50a–50n) the base station is provided with. Depending on its location, a mobile transceiver may be capable of communicating with more than one cell site base station (i.e., when the mobile transceiver may be located in an area of overlap between two or more cells). More often, however, a mobile tranceiver will be positioned within only one cell, and therefore must communicate, if at all, via the cell site base station of that cell. It is therefore important that some voice channel tranceivers of each cell site base station are always available (i.e., not in use) if new calls are to be processed without delay.

A more critical situation arises when a mobile transceiver already engaged in communications with a first cell (e.g., cell C9) is about to exit the first cell and move into a second cell (e.g., cell C8). If communications are to be continuously maintained as the mobile transceiver moves out of one cell and into another, it is necessary for the first cell to transfer the ongoing call to a cell into which the mobile transceiver is moving. Such transfers ("hand-offs") must occur reliably if ongoing communications are to continue without interruption. If the cell into which the mobile transceiver is moving has no voice channel transceivers available to handle the call hand-off, no hand-off is possible and the call will be lost as the mobile transceiver requiring the hand-off moves out of the effective service area of the cell site base station it is communicating with. In accordance with the present invention, instantaneous cell loading is periodically monitored and ongoing calls are transferred in order to redistribute or balance loading among the various cells in system 10.

Figure 3:
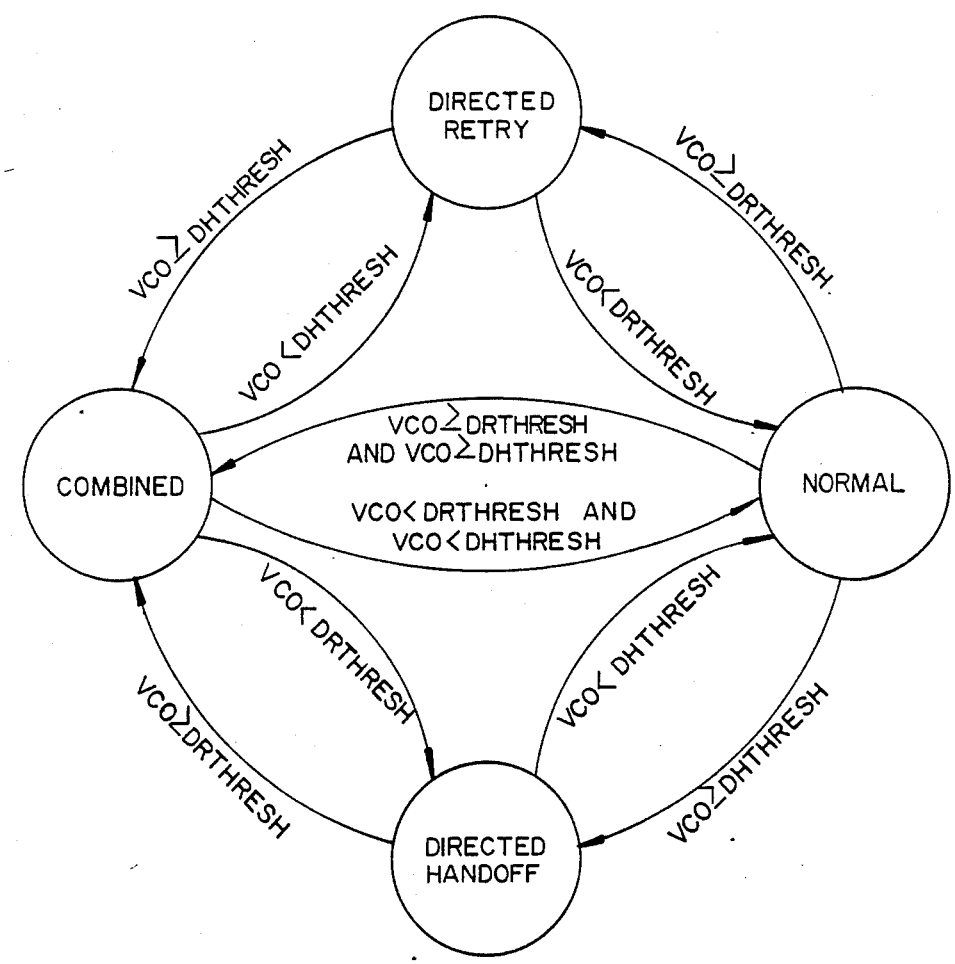
FIG. 3 is a schematic state transition diagram of the various states a cell site base station shown in FIG. 2 may assume and the conditions which cause transitions between such states.

FIG. 3 is a graphical illustration of a state transition diagram for each of the cell site base stations shown in FIG. 2. The cells of system 10 may enter one of four possible predetermined states in the preferred embodiment depending upon cell loading: (1) the "normal" state; (2) the "directed hand-off" state; (3) the "directed retry state"; and (4) the "combined" state. Transistions of cells between the various states are controlled in accordance with voice channel occupancy level (VCO), a measure of instantaneous cell loading. Two (independent) predetermined threshold values DHTHRESH and DRTHRESH are assigned to each cell in system 10. These values are determined by data stored in random access memory (RAM) 28 of MTX 20, and may be preset upon initialization of system 10. MTX 20 periodically computes the VCO of each cell, which is determined by comparing the number of voice channel transceivers of the cell site base station engaged in communications with respect to the total number of the voice channel transceivers the base station is provided with. Thus, the VCO of a cell rises as the cell handles more communications traffic.

The states of all cells of system 10 are set at time of initialization to the normal state. If cell loading increases so that cell VCO is greater than or equal to DHTHRESH, the cell enters the directed hand-off mode. The cell will remain in the directed hand-off mode until either its VCO decreases to less than (or equal to) DHTHRESH, or until cell VCO increases further to DRTHRESH (in which case the cell enters the combined mode).

Similarly, if the VCO of a cell in the normal state increases to DRTHRESH, the cell enters the directed retry mode. If cell loading decreases so that cell VCO$\leq$DRTHRESH, the cell will return to the normal mode. On the other hand, if cell loading increases further so that cell VCO$\geq$DHTHRESH, the cell enters the combined mode. Additional transitions between cell states are shown in FIG. 3. As can be seen, the state of a cell is determined by instantaneous cell loading (i.e., the amount of communications traffic it is presently handling with respect to the total amount of traffic it is capable of handling).

Cell site base stations are directed to perform certain functions and are inhibited from performing other functions depending upon cell state. Cell site base stations in the normal state are permitted to perform any of the functions a base station is capable of performing. For instance, cell site base stations for normal cells can accept call hand-offs from adjacent cells initiated either because a mobile transceiver is about to exit an adjacent cell and enter the normal cell or because balancing of loading of cells is desired. Normal cells are also permitted to handle new calls originated by mobile transceivers ("originations") or calls originated by central office 22 ("pages").

Cells in the directed hand-off state are so loaded that they are in danger of becoming completely blocked if traffic levels increase further. In accordance with the present invention, cells in the directed hand-off state are directed to hand-off some of the calls they are handling to adjacent cells in order to reduce cell loading to prevent complete cell blockage from occurring. MTX 20 instructs the cell site base stations of cells in the directed hand-off state to attempt to hand-off the number of calls necessary to reduce cell VCO to below the DHTHRESH threshold. However, cell site base stations of cells in the directed hand-off mode in the preferred embodiment will accept hand-offs initiated either due to load balancing or because needed to maintain an ongoing call as a mobile transceiver exits an adjacent cell and enters the cell in the directed hand-off state (a very high priority is placed upon maintaining ongoing calls without interruption in accordance with the present invention). It may be desirable in some applications to prevent cell site base stations of cells in the directed hand-off mode from accepting hand-offs due to load balancing (but permit such cells to accept hand-offs needed because a mobile station is about to exit an adjacent cell), although cells in the directed hand-off mode in the preferred embodiment accept both types of hand-offs to avoid unduly limiting the possibilities of handing off calls due to load balancing. Cells in the directed hand-off state in the preferred embodiment will handle new calls (originations or page responses) in order to permit additional mobile transceivers to access system 10 (even though handling of new calls does increase the loading of cells in the directed hand-off state, the cell in the directed hand-off mode may be the best cell to handle the new call or the only cell capable of doing so).

Cells in the directed retry state behave differently from cells in the directed hand-off state in order to preserve some voice channels for incoming hand-offs (due to either load balancing or in order to preserve ongoing calls about to be lost as mobile transceivers exit adjacent cells). Cells in the directed retry state refuse to accept new calls in order to preserve channels for hand-off attempts. The cell site base stations of cells in the directed retry mode turn away new calls and direct mobile transceivers involved in the new calls to try the cell site base stations of adjacent cells. Cells in the directed retry state do not attempt to hand-off calls to balance loading among adjacent cells (although they will, of course, hand-off calls which are in danger of being interrupted because a mobile transceiver is about to exit the cell). Cell site base stations of cells in the directed retry mode will accept call hand-offs initated due to either load balancing or due to mobile transceivers exiting adjacent cells. Cells in the directed retry mode thus function somewhat as "overflow" cells which, even though they are heavily loaded themselves, are capable of receiving hand-offs from other cells.

Cells in the combined mode behave similarly to both cells in the directed hand-off mode and to cells in the directed retry mode. Cells in the combined mode will not accept new calls (like cells in the directed retry mode) and will attempt to hand-off calls in progress (like cells in the directed hand-off mode). Cells in the combined mode are available for call hand-offs due to load balancing and call hand-offs necessary because a mobile transceiver is about to exit an adjacent cell.

By varying the DHTHRESH and DRTHRESH values (which are programmable on a cell-by-cell basis), the behavior of each cell of system 10 under different degrees of loading can be controlled. Typically, the DRTHRESH value of a cell is set to be higher than the DHTHRESH value of the cell to cause cells to enter the directed hand-off mode at lower VCO levels than necessary for the cells to enter the directed retry mode. The levels of DRTHRESH and DHTHRESH may be chosen in accordance with observed performance of system 10 (e.g., by gathering statistical information of actual system behavior under varying degrees of loading) and/or in accordance with cell size, cell location, and a number of other different factors. Information concerning cell mode and cell VCO level is stored in RAM 28 of MTX 20 and is periodically updated by processor 26 (in the manner which will be described shortly).

Figure 4:
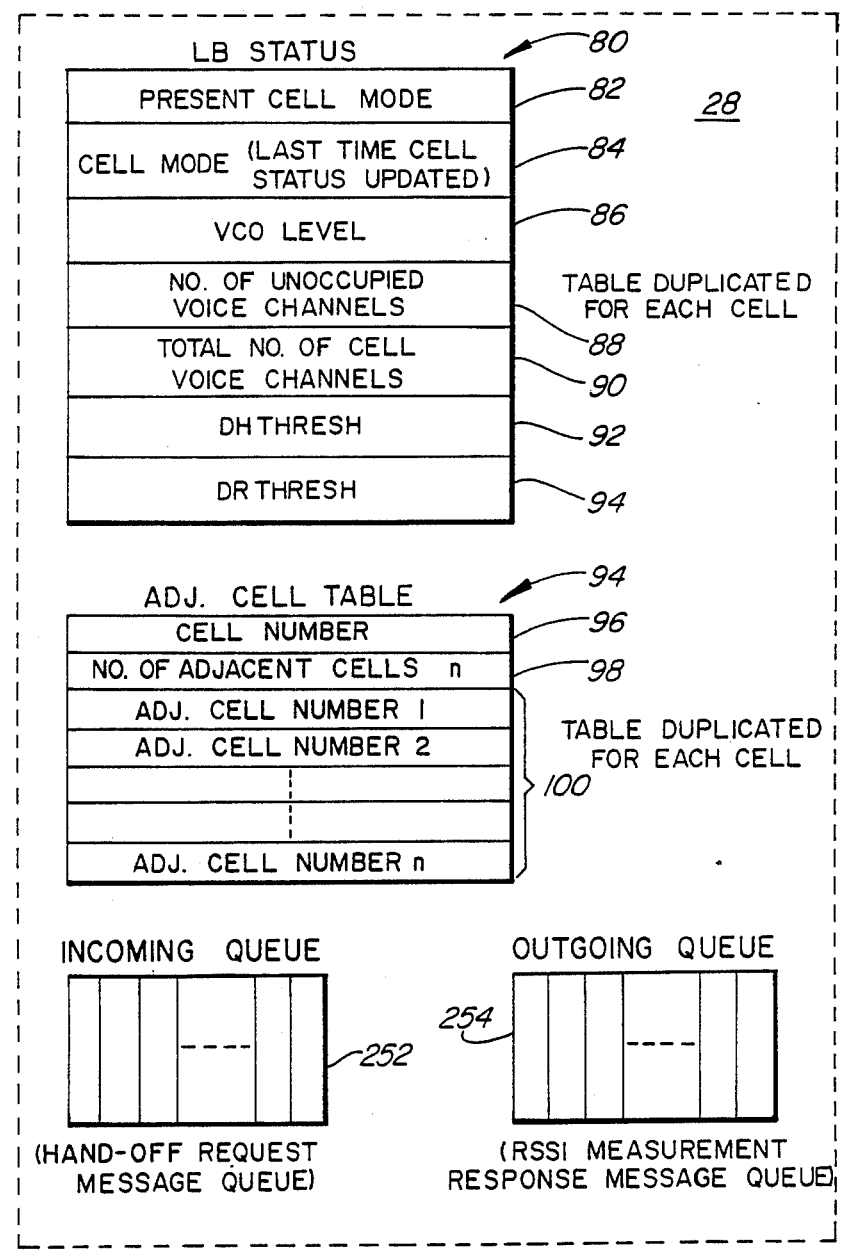
FIG. 4 is a schematic diagram of information maintained in the random access memory of the mobile telephone exchange (MTX) shown in FIG. 2.

FIG. 4 is a schematic diagram of some of the information processor 26 stores in RAM 28 and uses to perform load balancing and other functions. Each cell of system 10 has associated with it a Table 80 called LBSTATUS ("Load Balancing Status") and a Table 94 called "Adjacent Cell Table". The LBSTATUS Table 80 of each cell stores information concerning cell mode and cell VCO as well as the DHTHRESH and DRTHRESH values assigned to the cell. The LBSTATUS Table 80 includes: a present cell mode field 82 (which stores indicia of the present mode of the cell, either normal, directed hand-off, directed retry or combined); a field 84 storing the cell mode the last time the cell status was updated; a VCO level field 86 (which stores the current voice channel occupancy level of the cell); a field 88 containing the number of unoccupied (seizable) voice channels of the cell (i.e., the number of voice channel transceivers of the cell site base station which are not presently in use); a field 90 containing the total number cell of voice channels (i.e., the total number of voice channel transceivers of the cell site base station); a DHTHRESH field 92; and a DRTHRESH field 94. Fields 90, 92 and 94 typically remain constant after initialization of system 10 while fields 82–88 are periodically changed in accordance with instantaneous cell loading. Of course, it may be desirable to change the values of fields 90–94 under certain circumstances. For instance, field 90 should be updated if any of the voice channel transceivers of a cell site base station malfunction or otherwise are placed out of service. Moreover, it might be desirable to dynamically change the values of the DHTHRESH field 92 and DRTHRESH field 94 depending upon, e.g., overall system loading, changes in cell site base transceiver power output, the time of day, etc.

Adjacent cell Table 94 is duplicated for each cell (as is the LBSTATUS Table 80), and contains information specifying the cells adjacent to the cell associated with the Table. Adjacent cell Table 94 is indexed by a cell number field 96 which specifies the cell associated with it. A field 98 contains the number of cells adjacent to the cell associated with the table (this number can vary depending upon, for example, whether a cell is within the center of the service area of system 10 or on its periphery). Following the field 98 is a list of all of the cells adjacent to the cell associated with the adjacent cell Table 94 (for example, the adjacent cell table 94 of cell C12 of system 10 would include a list 100 having entries corresponding to cells C5, C6 and C13). List 100 may contain up to 14 adjacent cell designations in the preferred embodiment. Adjacent cell Table 94 is used to specify which cells are candidates for call hand-off or for hand-off retries, as will be explained.

Figure 5A:
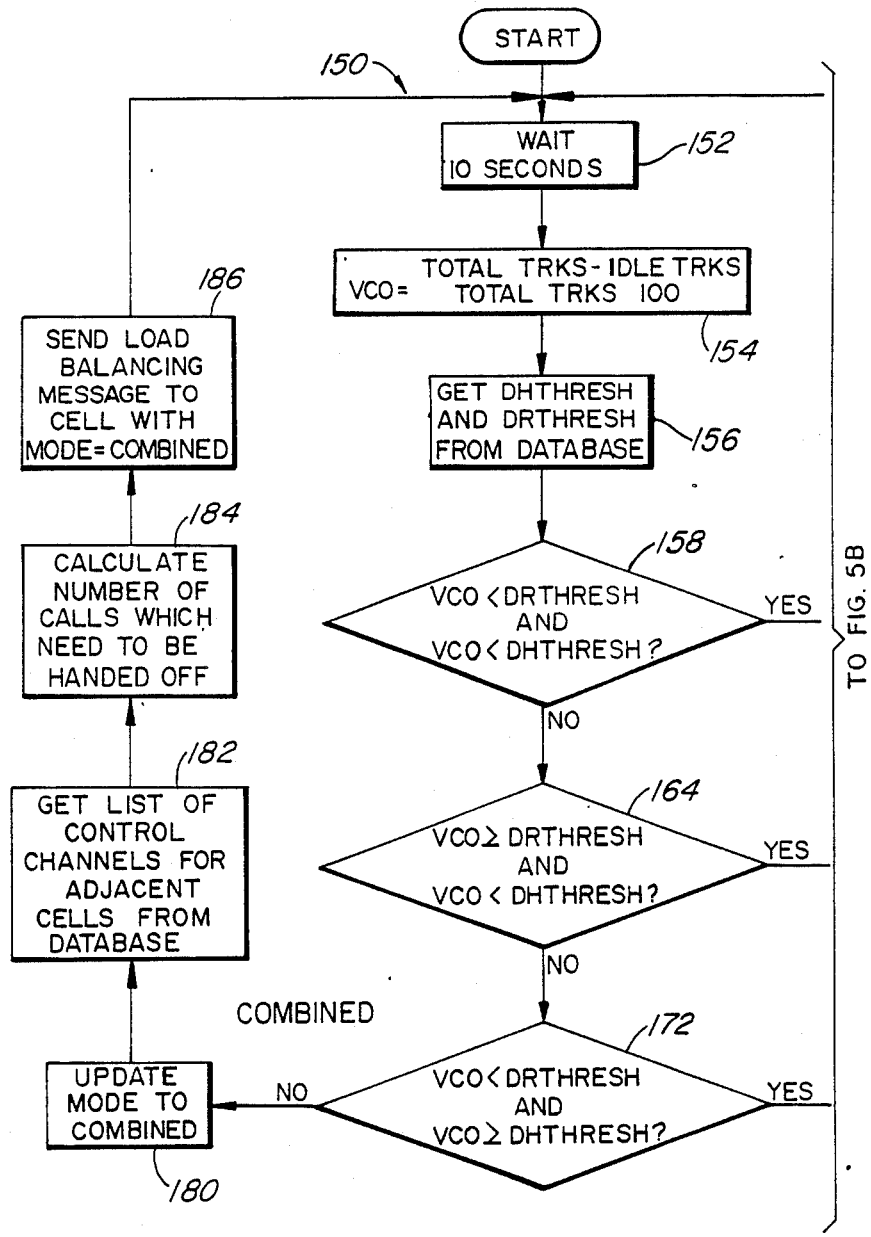
FIGS. 5(A) and 5(B) are together a flowchart of the load balancing routine performed by the MTX shown in FIG. 2.
Figure 5B:
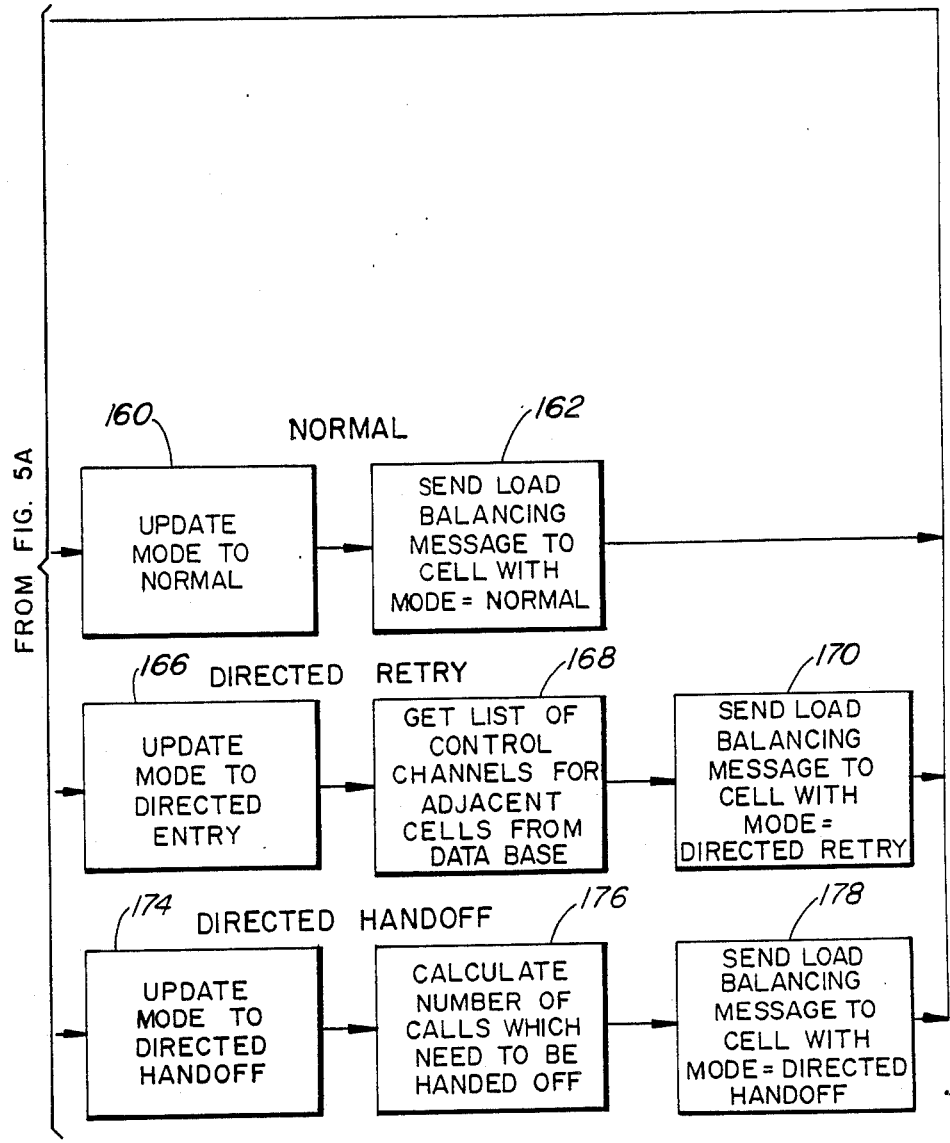

FIGS 5(A) and 5(B) are together a flow chart of the routine executed by MTX 20 to periodically update the state (mode) of each cell in system 10 to reflect current system traffic loading. The routine shown in FIGS. 5(A) and 5(B) is executed periodically (i.e., once every 10 seconds in the preferred embodiment for each cell, although the routine might be executed more or less frequently depending upon MTX processing resource availability, the rate messages are transferred between the MTX and the cell site controllers, and desired accuracy in the correspondence of cell state with instantaneous cell loading). After the predetermined wait time has elapsed (block 152), MTX 20 computes the voice channel occupancy (VCO) of the cell the state of which is being updated (block 154) according to the following equation:

$$VCO = \frac{\text{Total number of cell channels} - \text{unoccupied channels}}{\text{Total number of cell channels}} \cdot 100$$

Figure 6A:
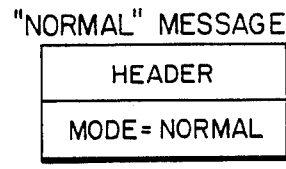
FIGS. 6(A)–6(E) are schematic diagrams of the formats of various messages communicated between the MTX and the cell site base stations shown in FIG. 2.

VCO may hence be computed from the fields 88 and 90 of the LBSTATUS table 80 associated with the cell. MTX 20 then retrieves the DHTHRESH and DRTHRESH values from corresponding fields 92 and 94 of the LBSTATUS table 80 associated with the cell (block 156), and compares the computed VCO level with these two threshold values. If VCO is less than DRTHRESH and DHTHRESH (tested for by decision block 158) the current mode of the cell is normal. MTX 20 rewrites the present mode field 82 of LBSTATUS table 80 to normal (block 160) and sends a load balancing message to the cell (via the high-level data link dedicated to the cell) instructing the cell to set its mode to normal (block 162). FIG. 6(A) schematically shows the format of the message sent by block 162 to instruct the cell to assume the normal state. This message includes only one field 202 (in addition to a conventional header field 200) indicating the new cell mode is normal. Routine 150 then returns to wait block 152 (after all other cells have been processed) to wait for the next time cell state is to be updated.

Figure 6B:
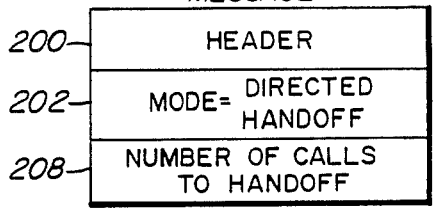
Figure 6C:
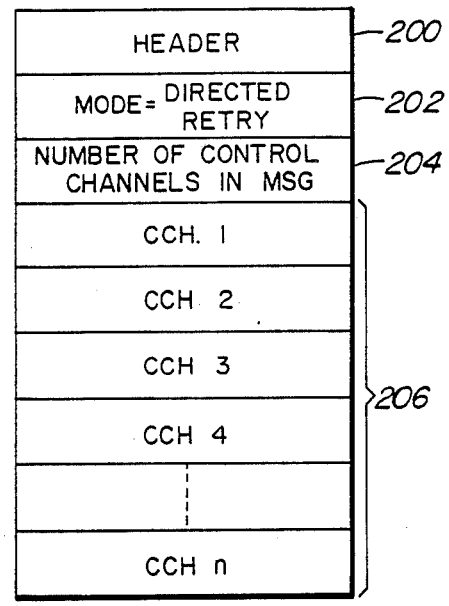

If VCO is not less than both DRTHRESH and DHTHRESH, decision block 164 determines whether VCO is $\geq$ DRTHRESH and $<$ DHTHRESH. If VCO falls within this range of values, the current cell mode is directed retry, and present mode field 82 is updated accordingly (block 166). As will be recalled, cells in the directed retry mode will refuse to participate in new calls with mobile transceivers, and will instead refer calling or called mobile transceivers to other cells not in the directed retry or combined modes. MTX 20 accesses the adjacent cell table 94 associated with the cell the state of which is being updated and obtains the list 100 of adjacent cells from this table (block 168). MTX 20 then removes all of the cells from this list which are currently in the directed retry or combined states, and sends the remainder of the list to the cell site controller of the cell in a message informing the cell to update its mode to directed retry (block 170). FIG. 6(C) is a schematic diagram of the format of the directed retry message sent by block 170 to the cell site controller. The directed retry message includes a header 200, a mode field 202 instructing the cell to update its mode to directed retry, a field 204 indicating the number of entries in a list which follows, and a list 206 of frequencies of control channels of cells adjacent to the cell the mode of which is being updated. As will be explained shortly, the cell site base station transmits this list 206 of control channels to the mobile transceiver in a message directing the mobile transceiver to try another cell.

If the cell VCO is not within the range tested for by decision block 164, decision block 172 determines whether VCO<DRTHRESH and ≧DHTHRESH. If VCO falls within the range tested for by decision block 172, the cell mode is set to directed hand-off (block 174) by rewriting the present mode field 82 of LBSTATUS table 80 of the cell accordingly. MTX 20 then calculates the number of calls which the cell must hand off to adjacent cells in order for the cell VCO to fall below DHTHRESH once again (block 176). The contents of fields 90 and 92 of the LBSTATUS table 80 of the cell determine a maximum number of calls which the cell can handle while still remaining in the normal state, and can be used to obtain the number of calls to be handed off. MTX 20 then transmits a directed hand-off load balancing message (schematically shown in FIG. 6(B)) to the cell including a field 202 instructing the cell to change its mode to directed hand-off and a field 208 storing the number of calls calculated in block 176 which the cell is to attempt to hand off (block 178).

Figure 6D:
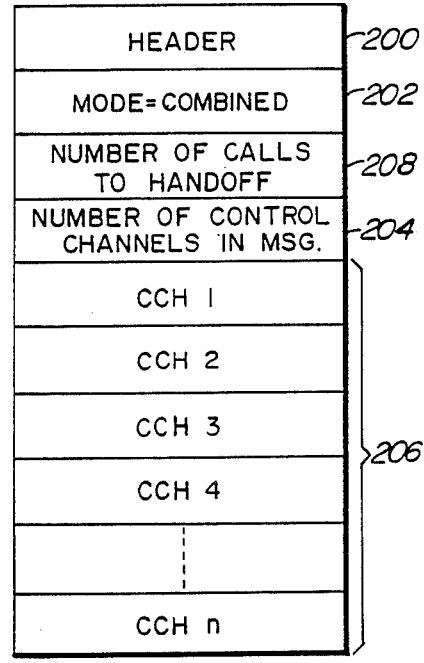

If VCO fails the decisions of blocks 158, 164 and 172, then VCO> or equal to DRTHRESH and > or equal to DHTHRESH, and the cell is in the combined mode. The present mode field 82 of the LBSTATUS table 80 is updated accordingly (block 180) and a list of adjacent cells is obtained in the manner described in conjunction with block 168 (block 182). The number of calls which need to be handed-off to reduce the cell VCO to the normal level are calculated as described for block 176 (block 184), and a load balancing message is sent to the cell site controller instructing it to change its mode to combined (block 186). FIG. 6(D) is a schematic representation of the format of the load balancing message sent to the cell in block 186. This combined load balancing message contains a field 202 instructing the cell to change its mode to combined, a field 204 and list 206 containing information corresponding to fields of the directed retry load balancing message shown in FIG. 6(C), and a field 208 containing the same information as the corresponding field in the directed hand-off message shown in FIG. 6(B). After the cell state has been updated, it will not be changed until after the time counted by wait block 152 has elapsed. However, the unoccupied voice channel field 88 of the LBSTATUS table 80 of the cell is updated continuously (or updated periodically according to the value of another storage location not shown which is continuously updated) as cell loading changes.

Figure 7A:
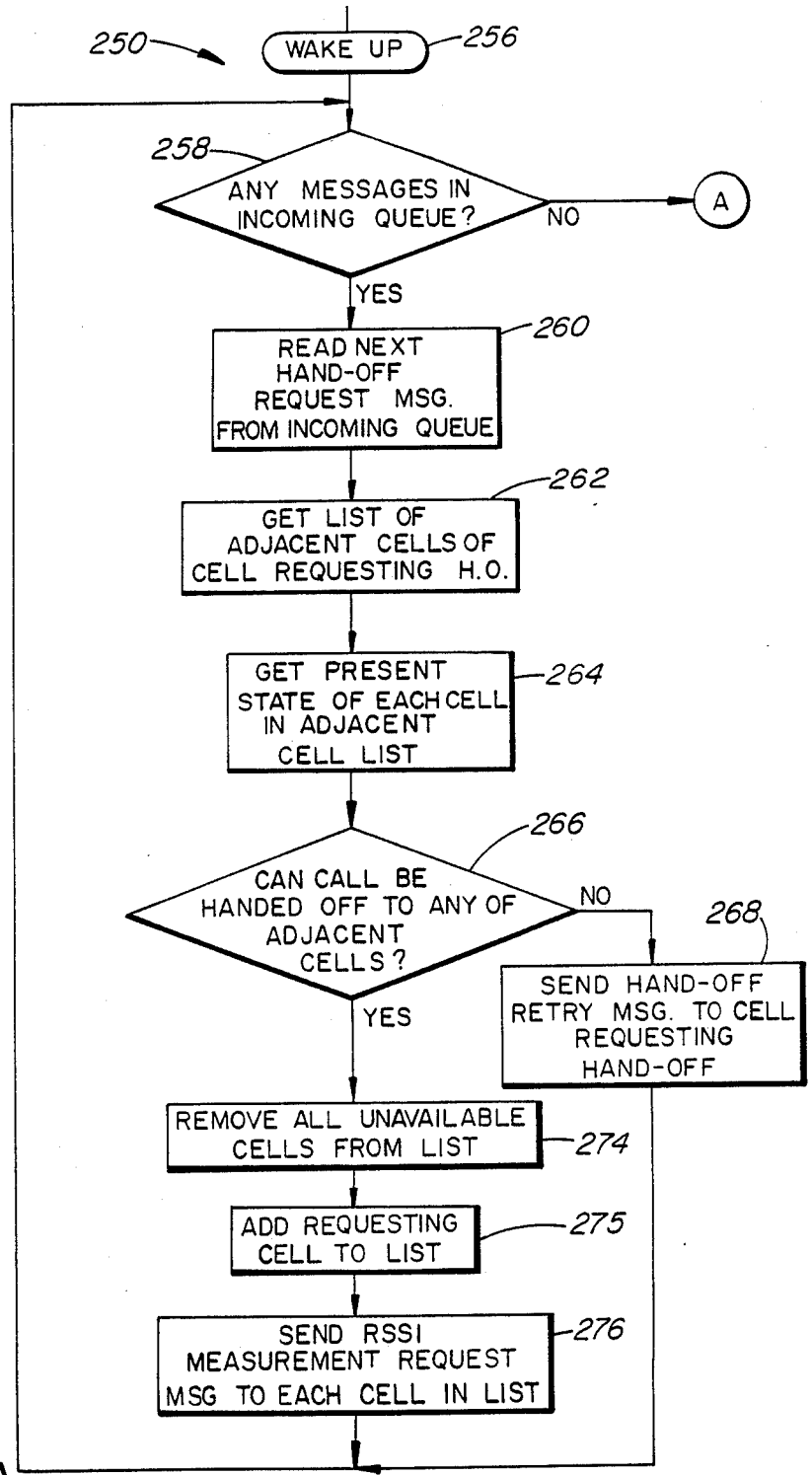
FIGS. 7(A) and 7(B) are together a flow chart of another routine executed by the MTX shown in FIG. 2.
Figure 7B:
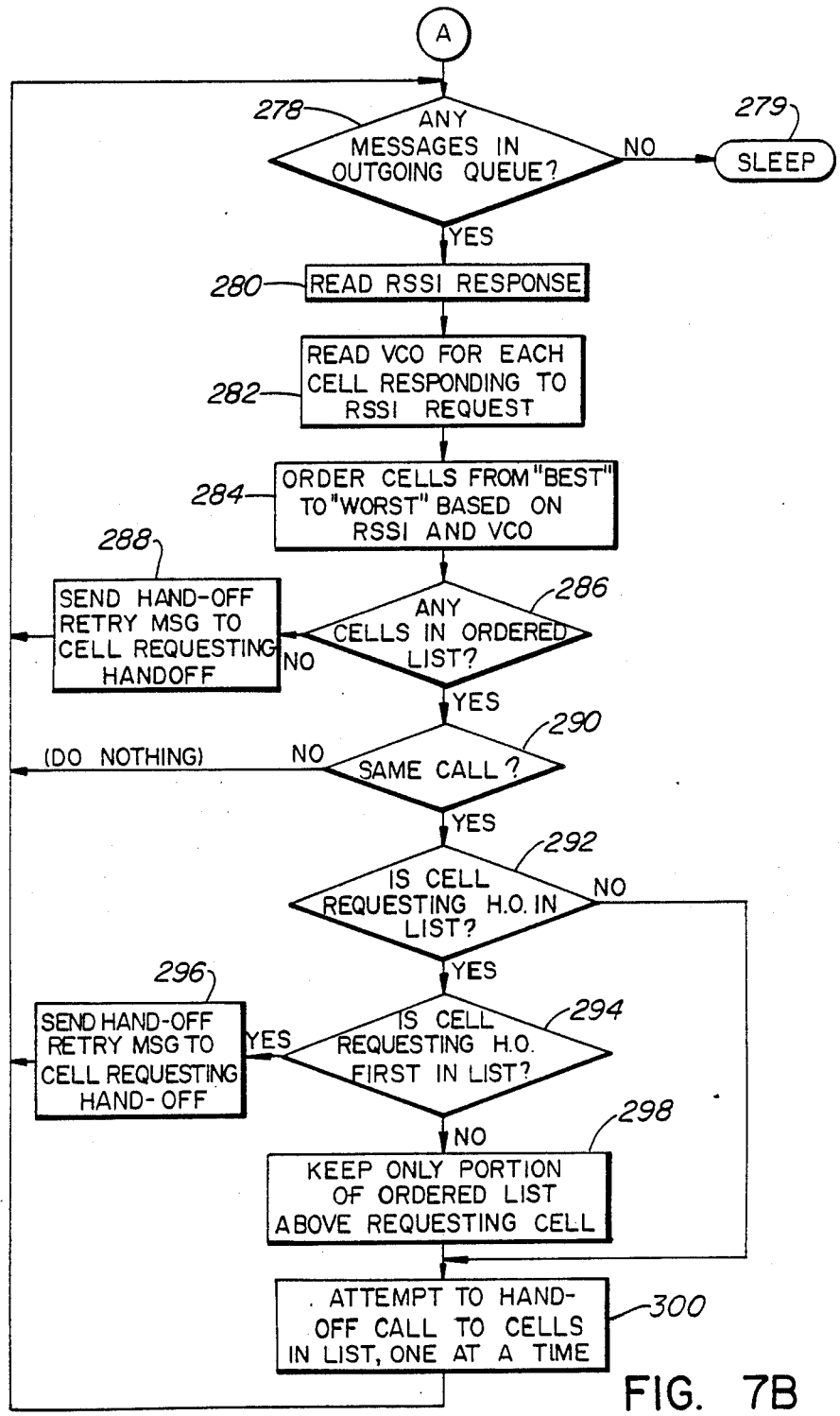

FIGS. 7(B) and 7(B) are together are a flowchart of a hand-off process routine 250 performed by MTX 20. Hand-off routine 250 receives hand-off request messages from the cell site base stations, determines whether a hand-off is possible, and computes which cells are the best ones to attempt to hand-off to (based on received signal strength indicator (RSSI) measurements and channel availability). Hand-off routine 250 then controls the cell site controllers to actually hand off calls from one cell to another.

Hand-off routine 250 is normally asleep, and wakes up periodically (once a second in a preferred embodiment) to process two queues of data: an incoming (hand-off request message) queue 252 and an outgoing (RSSI measurement response message) queue 254 (see FIG. 4). Input/output controller-interface 30 of MTX 20 writes hand-off requests received from cell site controllers into the incoming queue 252 even when hand-off process 250 is asleep, and likewise removes messages deposited into outgoing 254 by routine 250 and transmits them to the appropriate cell site controller. Conventional mechanisms (such as rotating pointers) are provided to prevent hand-off routine 250 and input/output controller-interface 30 from attempting to access the same locations in incoming or outgoing queues 252 and 254 at the same time.

In the preferred embodiment, a cell site controller writes an entry into incoming queue 252 whenever it wishes to request a call hand-off (either because it was instructed to do so by the load balancing routine 150 described above, or because one of the calls it is handling is about to be lost as a mobile transceiver exits the cell). Hand-off request messages deposited into incoming queue 252 include the following information in the preferred embodiment: channel designation (the channel the call to be handed-off is presently occupying); designation of the supervisory audio tone (SAT) of the hand-off candidate call; the reason for the hand-off (either load balancing or because a mobile transceiver is about to exit the cell); identification of the cell requesting the hand-off; and identification of the mobile transceiver participating in the call to be handed-off.

Upon waking up (block 256), hand-off routine 250 determines whether there are any hand-off request messages in the incoming queue 252 (block 258). If there are messages in the incoming queue 252, routine 250 reads the next message (block 260), determines which cell is requesting the hand-off, and reads the adjacent cell list 100 from the adjacent cell table 94 associated with the cell (block 262). Routine 250 then obtains the present state of each cell in the adjacent cell list (from the LBSTATUS tables of the cells; block 264) and determines if a hand-off is possible (block 266). Whether or not a hand-off is possible depends upon the reason for the hand-off and the states of the adjacent cells. A hand-off necessary because a mobile transceiver is about to exit a cell will be handled by all cells except those completely unavailable (i.e., completely blocked) (this statement is also applicable to hand-offs due to load balancing in the preferred embodiment). If none of the adjacent cells will accept the hand-off, hand-off routine 250 sends a hand-off retry message to the requesting cell (block 268) which simply instructs the cell to wait a period of time and then re-request the hand-off.

If, however, there are adjacent cells which can accept the hand-off, routine 250 removes all those cells which will not handle the hand-off from the adjacent cell list obtained by block 264 (to reduce message traffic in system 10). For example, all cells which have no channels at all available (i.e., those cells with a zero value stored in field 88 of their LBSTATUS table 8) are removed from the adjacent cell list (block 274), since these cells have no available channels and cannot handle any type of hand-off. Routine 250 then sends a message requesting each cell in the list (as modified by blocks 272 and 274) to measure the RSSI of the voice channel of the call desired to be handed-off by depositing appropriate messages in outgoing queue 254 (block 276).

The messages sent by block 276 simply request the cell site base stations of specified cells to monitor the voice channel of the call being handed-off with their locating receivers, measure the signal strength of the voice channel signal, produce a RSSI value corresponding to this measured signal, and report the RSSI back to MTX 20. Such RSSI measurement request messages include the following information in the preferred embodiment: a list of each of the cells which are to measure RSSI (the list including the cell requesting the hand-off for which the RSSI is being measured); information identifying the call being handed-off; and additional information needed to keep track of the status of the RSSI measurement request. Routine 250 reserves space (in outgoing queue 254 in the preferred embodiment) into which input/output controller-interface 30 may write the responses received back from the cell site base stations. Entries in outgoing queue 254 also include information indicating the time the RSSI measurement requests were sent, since routine 250 waits a predetermined period of time after the sending time for the cell site base stations to respond and only then looks for the responses.

Once RSSI measurement requests are deposited to outgoing queue 254 by block 276, routine 250 processes the remainder of the entries of the incoming queue 252 by returning to decision block 258. When incoming queue 252 is empty, routine 250 determines whether any RSSI response messages have been received in outgoing queue 254 (block 278) (as has been explained, the routine in the preferred embodiment will only look for these messages after giving the cell site base stations sufficient time to respond to the associated RSSI measurement requests). If the outgoing queue is empty, routine 250 goes to sleep (block 279) to conserve MTX processor resources, and wakes up again after a predetermined period of time has elapsed. If, however, there are RSSI response messages in outgoing queue 254, routine 250 reads the first response (block 280) and then retrieves the VCO of each responding cell from the LBSTATUS table 80 associated with the cell. As will be explained, cell site base stations do not respond to RSSI measurement requests in the preferred embodiment unless the measured RSSI is above a predetermined minimum threshold value in order to reduce message traffic (cells measuring RSSI less than this minimum threshold value could not provide adequate hand-off service and therefore would have to be eliminated from the list of possible cells to hand-off to by MTX 20).

Routine 250 orders responding cells from "best" to "worst" based upon RSSI value and VCO. Block 284 produces a list of possible cells for handing-off the call in order, from top to bottom, of relative qualifications as candidates for handling the hand-off. The list produced by block 284 includes all cells responding to the RSSI request message in order from strongest to weakest RSSI level. In the event two cells respond with the same RSSI level, those cells are ordered from lowest to highest VCO beginning with the lowest VCO. No cells which are completely blocked (i.e., not having at least one available channel) are included in the list.

While the process briefly described above in connection with block 284 produces satisfactory results, a slightly more complex process is used in the preferred embodiment to reduce the number of uneconomical hand-offs and to take features adding flexibility to system 10 into account. Cell site transceivers and mobile transceivers in the preferred embodiment are each capable of dynamically changing transmitter output power to avoid loss of communications with a mobile transceiver about to exit the cell (as an alternative to handing off calls due to insufficient signal strength and to be used when there are no adjacent cells to hand the call off to). The preferred embodiment also permits calls to be handed off (due to insufficient signal strength) at RSSI levels which are adjustable on a cell-by-cell basis to permit factors such as cell geography to in part determine whether a hand-off is necessary. The process performed by block 284 permits these additional features to be used while optimizing transferee cell selection and avoiding uneconomical hand-offs altogether.

Each cell of system 10 has a nominal hand-off threshold value associated with it. This nominal threshold value represents a received signal level below which acceptable service cannot be maintained. In order to provide additional flexibility and to account for cell geography (e.g., different terrains), a threshold delta value (programmable on a cell-by-cell basis) is also associated with each cell. The threshold delta value is a cell site parameter that specifies the minimum difference between the cell nominal threshold value and the RSSI of an on-going call necessary before the call will be handed off due to insufficient RSSI. The threshold delta value is progammable for each cell to permit cell geography to be taken into account. For instance, cells covering flat prairies or similar terrain typically have small threshold delta values while cells covering downtown areas have relatively large threshold delta values in order to compensate for the skyscrapers and numerous other obstructions which can introduce signal fading.

In the preferred embodiment of the present invention, a threshold modifier value is used to determine if a response to an RSSI measurement request message should be sent to MTX 20. The threshold modifier value is used in the preferred embodiment to instruct adjacent cells to change their threshold values used to determine when a hand-off due to low RSSI is necessary in accordance with the following equation:

THRESHOLD MODIFIER=THRESHOLD DELTA−(THRESH1−RSSI1)−(THRESH2−THRESH1)

where THRESH1 is the nominal threshold value of the cell serving the call (the transferor cell), RSSI1 is the RSSI of the call at the transferor cell site base station, THRESH2 is the nominal threshold value of the potential transferee cell, and RSSI2 is the RSSI of the call at the transferee cell site base station (negative values are assumed), and THRESHOLD DELTA is the adjusted threshold. For example, suppose a transferor cell C9 has a nominal threshold THRESH1 = −90 (dB), a threshold delta value THRESH DELTA = 6, and a current signal strength RSSI1 = −92, while a potential transferee cell C2 has a nominal threshold THRESH2 = −100 and a current RSSI2 = −94. The threshold modifier 6−((−90−−92)−(−100 −−90)) = +14. This threshold modifier is added to the nominal threshold THRESH2 = −100 to obtain an adjusted threshold of −86, which is higher than RSSI2 = −94. Hence, the call will not be handed off (the call would be handed off if RSSI2 = −102, for example, or if the THRESH DELTA value was set to a lower value (e.g., 1)).

Routine 250 must ascertain RSSI1 in order to solve the equation set forth above. Therefore, the message sent by the transferor cell to MTX 20 requesting a hand-off due to low RSSI will contain this information (actually THRESH1-RSSI1 in the preferred embodiment). If the hand-off request is due to load balancing, this information is not required. When MTX 20 receives the hand-off request, it in turn requests adjacent cells to measure RSSI of the call which is the subject of the hand-off request by sending one or more RSSI measurement request messages (as have been described). In the preferred embodiment, these request messages each contain a transferee cell threshold modifier value which should be added to (or subtracted from) the nominal hand-off threshold of the potential transferee call to compute an adjusted threshold value ((THRESH1−RSSI1)+THRESH2). Thus, the threshold modifier value of cell C2 in the above example would be set to 14. This value would be transmitted to cell C2 together with the reason for the hand-off. Cell C2 would add this value to its nominal threshold value THRESH2 and compare the resulting sum (−100+14 = −86 in the example) with the RSSI of the call at the potential transferee cell (RSSI2) to determine whether a response to the RSSI request message is to be sent. This comparison is made to reduce message traffic (only cell site base stations measuring a RSSI level greater than cell adjusted threshold value will report the measured level to MTX 20, since a cell measuring RSSI below this value cannot provide adequate service to the hand-off).

Thus, hand-offs due to poor signal quality should be directed only to adjacent cells receiving the call to be handed off at a better *absolute* RSSI than that of the cell serving the call regardless of the adjusted threshold value of such adjacent cells. This is why the transferee cell threshold delta value is calculated on the basis of the threshold modifier value of the transferor cell (and does not depend on the threshold delta value the transferee cell would use if it was the transferor cell). This restriction guarantees that an adjacent cell capable of rendering better service than the cell serving a call will accept a hand-off due to low RSSI even if the adjacent cell might itself try to hand off the call (so long as this cell is the best cell to serve the call). In contradistinction, a call being handed off for purposes of load balancing is received by the cell site base station serving the call at an RSSI level above the cell adjusted threshold value (otherwise, the hand-off would be because of low RSSI). Therefore, a load balancing hand-off should be directed to a transferee cell which receives the call being handed off not merely at a signal level which is equal to or in excess of the signal level of the call at the cell originating the hand-off, but also in excess of the adjusted threshold value of the transferee cell. If this is not the case, the transferee cell will, after acquiring the call, immediately attempt to hand off the call due to inadequate RSSI (often back to the cell which was serving the call originally), accomplishing nothing except increasing system message traffic.

To prevent such uneconomical hand-offs from occurring, cell site controllers in the preferred embodiment report different RSSI measurement values to MTX 20 in response to RSSI measurement requests depending upon the reason for the hand-off request involved (low RSSI or load balancing). As will be explained, an additional "reason" field (flag) sent along with each RSSI measurement request in the preferred embodiment selects which RSSI measurement value the cell site controllers receiving the request are to report. If the reason for the hand-off is low RSSI, the cell site controllers report the difference between measured RSSI value and *adjusted* threshold value. On the other hand, cell site controllers report the difference between measured RSSI and *absolute* threshold value if the hand-off is due to load balancing.

In either case, the measured RSSI level must exceed the adjusted threshold value for reporting to occur. If the hand-off is due to load balancing, the measured RSSI level will not be reported unless it exceeds both the absolute (nominal) threshold value *and* the adjusted threshold value. Routine 250 may then scale each reported difference value depending upon cell site base station and mobile transceiver power output (at least in the case of hand-offs due to low RSSI), since some reporting base stations may be able to provide better service if power output was dynamically increased.

Block 284 simply sorts the resulting difference values by magnitude from greatest difference (highest signal strength relative to the levels selected for comparison) to least difference (lowest signal strength relative to the levels selected for comparison). Cell mode is used to choose between cells reporting back the same difference value (with normal mode cells preferred over directed retry or directed hand-off mode cells, and cells with lower VCOs being preferred over cells with higher VCOs).

If no cells are listed in the ordered list produced by block 284 (as tested for by decision block 286), a hand-off retry message is sent to the cell requesting the hand-off (block 288) instructing the cell to wait a short period of time and then rerequest the hand-off if it is still desired at that time. If, however, there is at least one cell in the ordered list, routine 250 determines if the same call is still in progress (block 290). If the call which was the subject of the hand-off request has terminated, there is no need to hand the call off and nothing is done.

If the same call is still in progress, routine 250 determines whether the cell requesting the hand-off is in the ordered list (block 292). As will be recalled, routine 250 sends an RSSI request message to the cell site base station requesting the hand-off as well as to the cell site base stations of cells adjacent to the cell requesting a hand-off. This is to ensure the call should in fact be handed-off (e.g., the mobile transceiver may have moved behind an obstruction) and to continuously optimize the cells handling calls. If the requesting cell is in the ordered list, routine 250 determines whether the cell is at the top of the list (block 294). Even though a cell requests a hand-off, it may nevertheless be the best cell to handle the call, and routine 250 sends a hand-off retry message to the cell in this event (block 296). If the cell requesting the hand-off is in the list but is not at the top of the list, all entries in the list which are worse candidates for handling the hand-off than the cell requesting the hand-off (i.e., those cells listed below the requesting cell) are eliminated from the list (block 298). If the requesting cell is not in the list (or has been removed from the list by block 298), routine 250 attempts to hand-off the call to cells in the list, one at a time, beginning with the cell at the top of the list (block 300). The process of block 300 in the preferred embodiment is actually performed by a call processor of conventional design which operates independently of routine 250. This call processor is responsible for initiating as well as actually handing-off calls by supervising cell site base stations through signalling protocol of the type described in EIA Interim Standard compatability specification 1S-3-B. The call processor has the additional responsibility of updating field 88 of the LBSTATUS table 80 of each cell as new calls are begun and calls are terminated or handed-off.

Figure 6E:
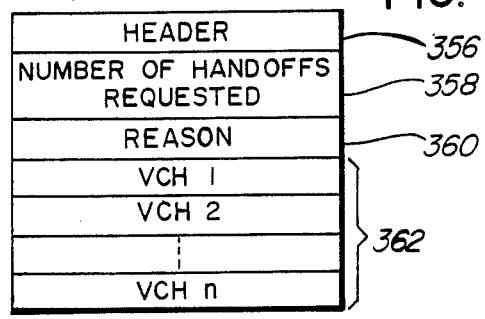
Figure 8A:
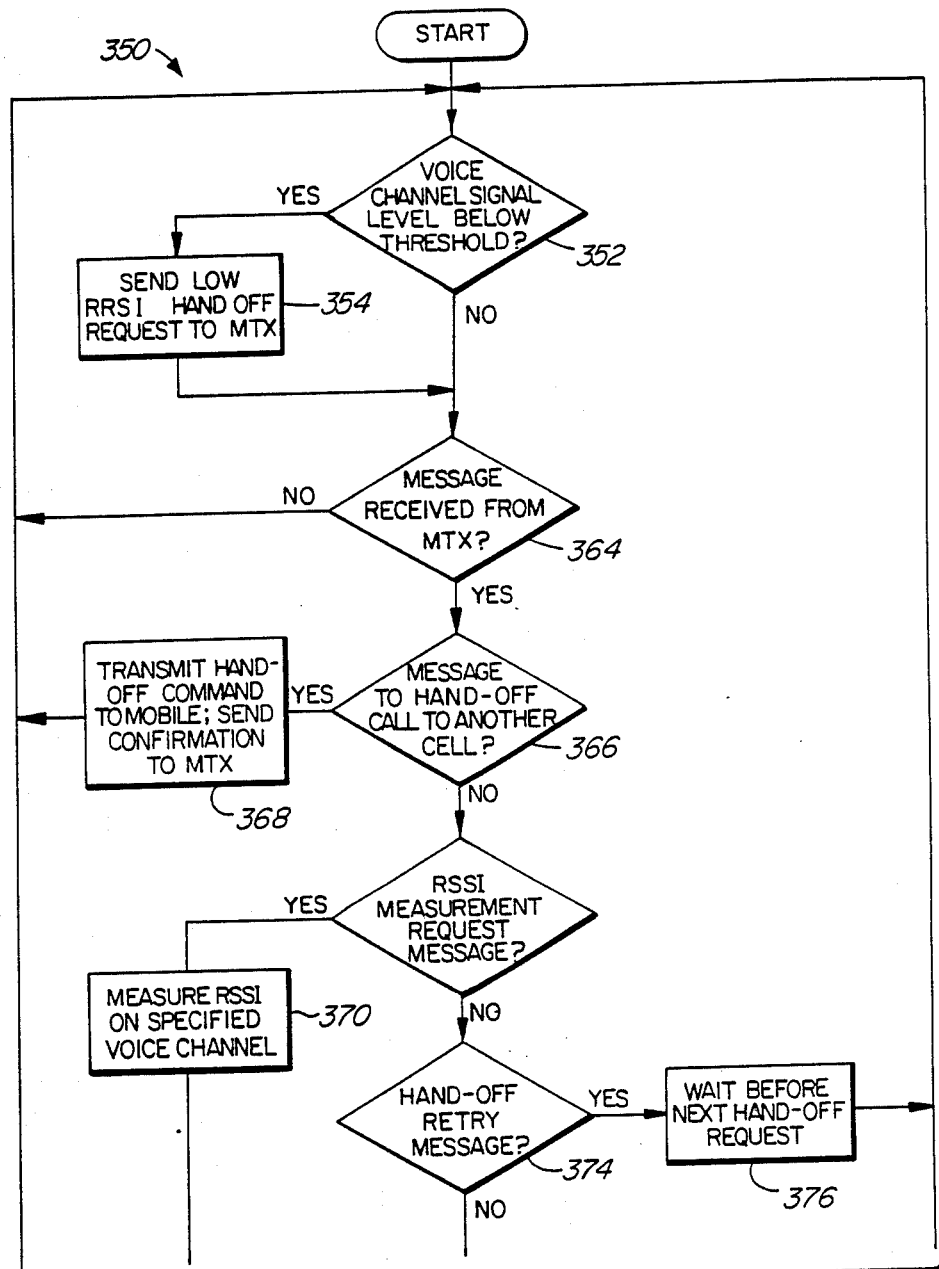
FIGS. 8(A) and 8(B) are together a flow chart of steps performed by each of the cell site controllers of the cell site base stations shown in FIG. 2.
Figure 8B:
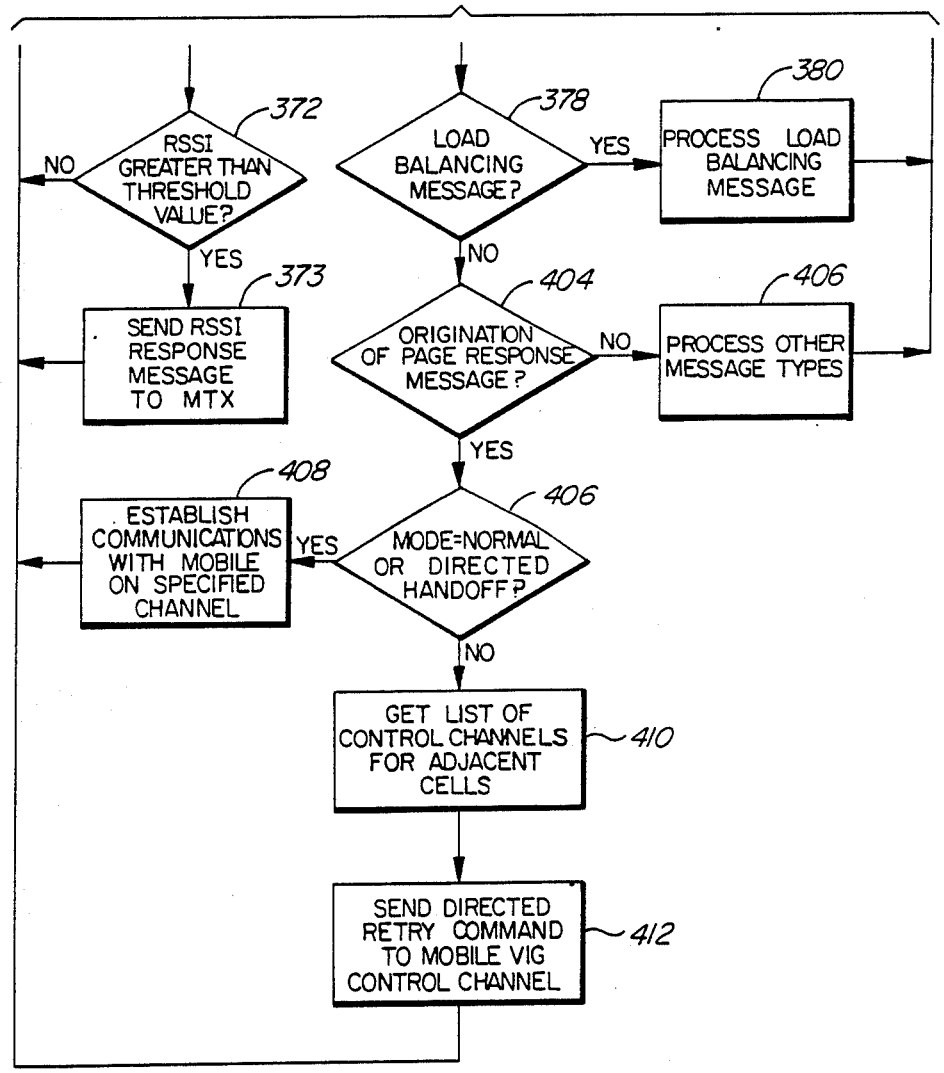

FIGS. 8(A) and 8(B) are together a flowchart of a process continually executed independently by each of the cell site controllers of the cell site base stations of system 10. The function of routine 350 is to decide when a hand-off should be requested due to insufficient RSSI, to provide communications with MTX 20, and to interact with mobile transceivers engaged in calls in progress or attempting to access a communications channel. Routine 350 (executed by, e.g., cell site processor 32) continuously monitors the RSSI of all calls in progress (such as by measuring AGC voltage of each of the receiver portions of voice channel transceiver 50a–50n), and determines whenever one of these RSSI values falls below a predetermined minimum (adjusted) threshold level (decision block 352). This event indicates that a mobile transceiver engaged in a call in progress is about to exit the cell and that the call must be handed-off to an adjacent cell if it is to continue without interruption. Routine 350 sends a hand-off request to MTX 20 specifying low RSSI as the reason for the hand-off (block 354). FIG. 6(E) is a schematic diagram of the format of the hand-off request message sent by block 354. The hand-off request message includes a header 356, a count field 358 specifying the number of hand-offs requested (usually only one for a low RSSI hand-off request), a reason field 360 specifying the reason for the hand-off (low RSSI or load balancing), and a list 362 of voice channels (and other call designation information) specifying the call which the hand-off request applies to (a RSSI difference value as described previously may also be included).

Next, routine 350 determines if a message has been received from MTX 20 (decision block 364). If a message has not been received, routine 350 returns to monitor voice channel signal levels (decision block 352). If a message has been received, however, routine 350 determines if the message requires the cell site base station to hand-off a call to another cell (such messages would be generated by block 300 shown in FIG. 7 (B)) (block 366). If a hand-off instruction message is received, routine 350 transmits a hand-off command to the mobile transceiver engaged in the call to be handed-off (typically specifying the voice channel and other information), and sends a confirmation message to the MTX after receiving appropriate hand-shaking information from the mobile transceiver (block 368). Conventional hand-shaking mechanisms are included in this process to ensure calls are not lost during hand-off attempts.

If a message has been received from MTX 20 but it is not an instruction to hand-off a call to another cell, routine 350 determines whether the received message is a request to measure RSSI (decision block 368). If this type of message is received, routine 350 measures RSSI on the voice channel specified by MTX 20 (block 370) and determines if the measured RSSI is greater than a predetermined threshold value (block 372). Cell site base stations measure RSSI on specified voice channels in the preferred embodiment by simply tuning their locating receivers to the specified channel to obtain a measurement of signal strength. Of course, an unused voice channel transceiver could be used instead, if desired, in order to reduce equipment cost. If the measured RSSI value is below the threshold (indicating the cell cannot adequately service the call), no response to the RSSI request is sent to MTX 20 (this decision is performed as described previously), and routine 350 returns to decision block 352. On the other hand, measured RSSI levels above the threshold value are reported to MTX 20 (block 373).

If a message has been received which fails the test of decision blocks 366 and 368, routine 350 determines if the message is a hand-off retry message (block 374). If a hand-off retry message is received, routine 350 waits (block 376) before generating another hand-off request. After waiting a predetermined period of time (block 376) (a few seconds in the preferred embodiment), routine 350 may re-measure voice signal level (decision block 352) to determine if a hand-off due to low RSSI is necessary if the reason for the hand-off requests was low RSSI. If the reason for the hand-off requests was load balancing, routine 350 may simply give up and wait for MTX 20 to request it to originate additional load balancing messages if necessary.

Figure 9:
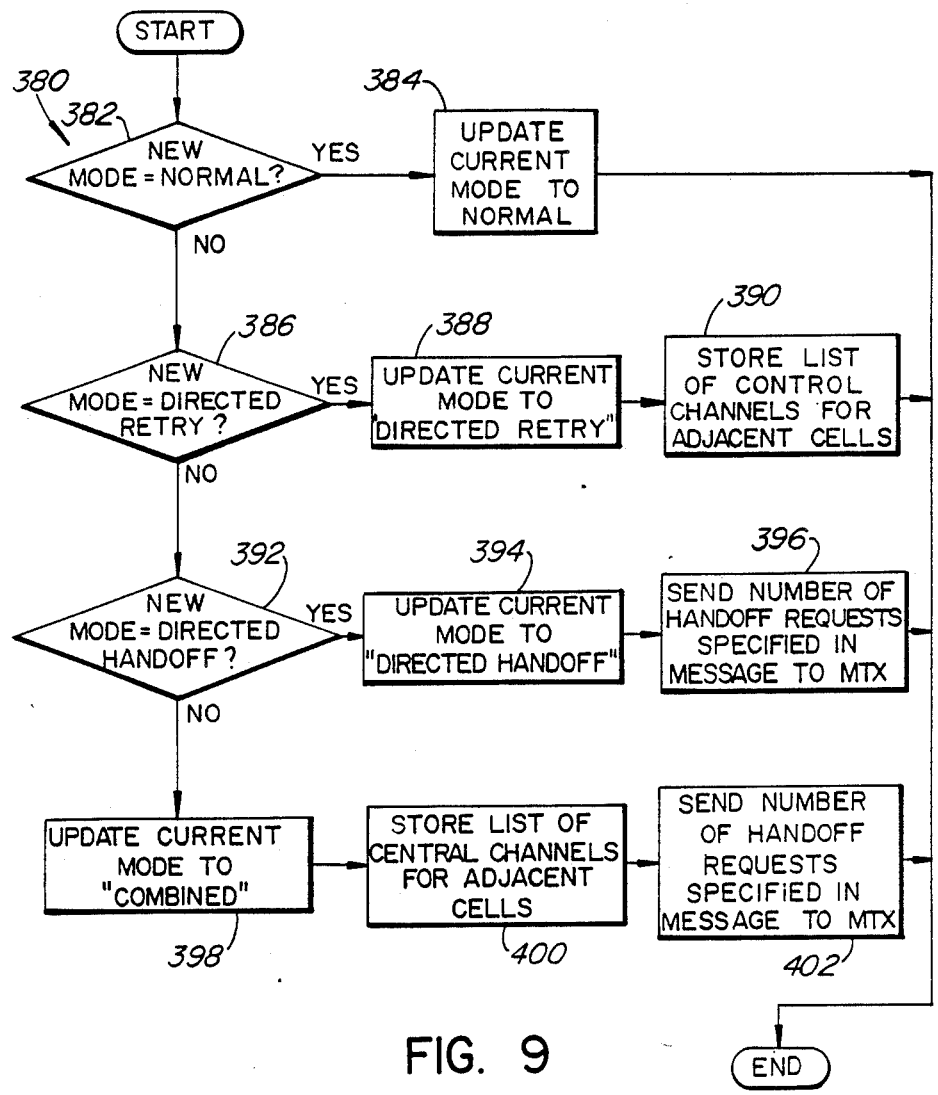
FIG. 9 is a detailed flow chart of the steps performed by the "process load balancing message" block shown in FIG. 8.

If a received message fails the test of decision blocks 366, 368 and 374, routine 350 determines if the received message is a load balancing message (decision block 378). If a load balancing message has been received, it is processed (block 380) depending upon the type of load-balancing message. FIG. 9 is a detailed flow chart of the steps performed to process a load balancing message. If the load balancing message commands the cell site base station to update its current mode to normal (such a message is sent in block 162 shown in FIG. 5), routine 350 simply sets a storage location (flag) to reflect a new current mode of normal (blocks 382 and 384). If the new mode is directed retry (decision block 386) (such a load balancing message is sent by block 170 shown in FIG. 5), routine 350 updates the current cell mode to directed retry (block 388) and stores the list 206 of channels transmitted in the load balancing message (see FIG. 6 (C)).

If, on the other hand, the load balancing message specifies the new cell mode as being directed hand-off (decision block 392) (such a message is sent by block 178 shown in FIG. 5), routine 350 sets the current cell mode to directed hand-off (block 394), and sends the number of hand-off requests specified in field 208 of the directed hand-off message (see FIG. 6 (B)) to MTX 20. These hand-off requests are sent together in list 362 (as many as four at a time in the preferred embodiment) of a hand-off request message (see FIG. 6(E)) to reduce message transfer overhead. Although routine 350 could arbitrarily choose ongoing calls to be handed-off, optimization is provided in the preferred embodiment by selecting those calls with the weakest RSSI levels (in the hope that the adjacent cells to which the calls are handed-off may provide somewhat better service and will not need to hand-off the call to yet another cell anytime soon).

If the received load balancing message fails decision blocks 382, 386 and 392, then the new cell mode is updated to combined (block 398), the list 206 contained in the combined load balancing message (FIG. 6 (D)) is stored (block 400) and routine 350 originates the number of hand-off requests specified in field 208 of the load balancing message to MTX 20.

Referring once again to FIGS. 8(A) and 8(B), a received message which is not any of the messages already tested for is tested to determine whether it is an origination or page response message (block 404). If the message is not of this type, it is processed according to type (block 406) (for example, the message may be a diagnostic or initialization message and will be processed accordingly). If the received message is an origination or page response message, however, routine 350 polls the current cell state to determine if it is normal or directed hand-off (decision block 406). If the mode is normal or directed hand-off, the cell is permitted to handle new calls, and routine 350 establishes communications with the mobile transceiver on the channel specified by MTX 20 (transactions between the cell site base station and the mobile transceiver initiated in response to origination and page response messages are conventional and communications with mobile transceivers are established in response to these messages in a conventional fashion) (block 408).

If the current cell mode is directed retry or combined, however, the cell is not permitted to participate in new calls and instead instructs the mobile transceiver involved to try another cell by transmitting the directed retry command to the mobile transceiver. Routine 350 obtains the list of control channels for adjacent cells sent in the most recent directed retry or combined load balancing message (see blocks 390 and 400 shown in FIG. 9) (block 410), and sends a directed retry command to the applicable mobile transceiver via the cell site control channel transceiver (44, 46, 48) (block 412). Upon receiving the directed retry command sent in block 412, the receiving mobile transceiver will scan the control channels specified by the transmitted list to find the one with the highest signal strength, will lock on to that control channel, and will attempt to establish communications with the cell site base station transmitting that control channel. Since block 168 of routine 150 shown in FIG. 5 never includes cells in the directed retry or combined state in this list of control channels, mobile transceivers are never directed to cells which will refuse them access due to traffic loading (although some of the listed control channels may be for cells which are not within the range of useful communications of the mobile transceiver).

As has been described, system 10 in accordance with the present invention gives priority to calls requiring hand-offs by using a dynamic load sharing algorithm which reserves a given number of voice channels in each cell for calls being handed-off. A key feature of cellular systems is the ability to hand-off an ongoing call from one cell to another by balancing traffic load between cells. In the preferred embodiment, blockage of calls and loss of calls during hand-offs are avoided by taking advantage of the overlapping cell coverage areas designed into a typical multi-cell system. Load balancing helps to maintain some open channels for calls requiring hand-off due to weak signal strength without requiring additional total channels or equipment to be provided.

In order to assess the effectiveness of the hand-off and dynamic load balancing techniques in accordance with the present invention, different systems were modelled and studied with the help of the Cellular System Traffic Simulator (CSTS) computer-aided simulation tool developed to provide comprehensive call-by-call simulation for mobile systems. The simulation's key parameters are specified by the user through a set of input files. Some of these parameters are: the length of simulation run, the number of cells and their coverage areas, the average call holding time, and the traffic distribution. The cellular system's geographic service area is overlayed with a rectangular grid used to locate the positions of the cell site antennas and mobile units with calls currently in progress. The typical statistics collected are: breakdown of call set-ups according to call type and call disposition; breakdown of calls according to whether they were completed normally, were blocked on hand-offs or left the service area; blocking on the RF channels and the land line trunks, etc. This software tool has been used extensively by others for analyzing the performance of actual systems during planning stages.

Figure 1:
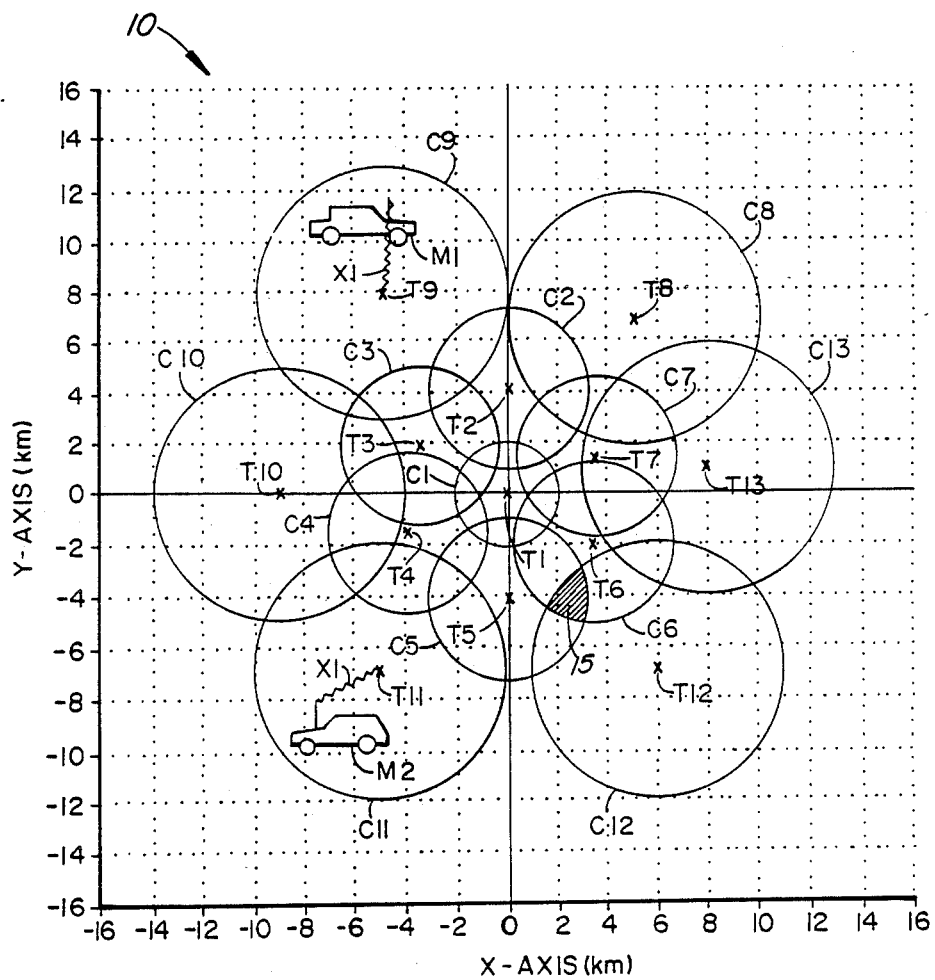
FIG. 1 is a graphical illustration of a 13-cell cellular mobile radiotelephone system.

The results of the simulation which was conducted are based on the 13-cell mature system shown in FIG. 1. The parameters considered in the specification of this system include holding times, traffic mix, contours, voice channel grade of service, cell coverage, cell overlapping, mobile transceiver transit speed and mobile traffic distribution.

Cellular mobile radio systems typically have relatively short holding times ranging from about 70 seconds to 140 seconds. The call holding time for purposes of the simulation was set at 120 seconds. Typical systems normally carry far more mobile-to-land traffic than land-to-mobile traffic. Moreover, mobile-to-mobile traffic is typically relatively low. A distribution of 65% mobile-to-land traffic, 30% land-to-mobile and 5% mobile-to-mobile traffic was assumed. The "bad service" contour of the cell in the simulation was set at −85 dBm, which identifies when a hand-off attempt should be initiated. The RF channels in the simulation were dimensioned for 2% blocking under normal load and no load balancing. The number of RF channels for the system shown in FIG. 1 are listed in Table I below:

TABLE I

| Cell | Total Number of Channels |
|---|---|
| C1 | 24 |
| C2 | 32 |
| C3 | 28 |
| C4 | 29 |
| C5 | 33 |
| C6 | 26 |
| C7 | 28 |
| C8 | 18 |
| C9 | 13 |
| C10 | 15 |
| C11 | 19 |
| C12 | 15 |
| C13 | 18 |

For purposes of the simulation, the small cell (cell C1) was assumed to have a hand-off radius equal to two kilometers, the medium-size cells (e.g., cell C2) were assumed to have hand-off radii of 3.2 kilometers, and the larger cells (e.g., cell C9) were assumed to have hand-off radii of 5.0 kilometers.

Cell overlapping is a very important factor for hand-off reliability because a cellular system layout with only small amounts of overlap has less flexibility in handling shifts in mobile user density. The classic hexagonal minimum coverage layout results in only 5.7% overlap between any two cells if the hexagons are replaced by circles. This amount of overlap is not enough for reliable hand-offs. On the other hand, excessive overlap may have negative co-channel interference effects, not to mention the extra cost of either increased transmitter power or antenna height. Overlapping to the extent shown in FIG. 1 was used for purposes of the simulation. However, optimum overlapping in an actual cellular system may be determined from actual traffic statistics measured by the system in order to minimize co-channel interference and increase hand-off reliability.

Figure 10:
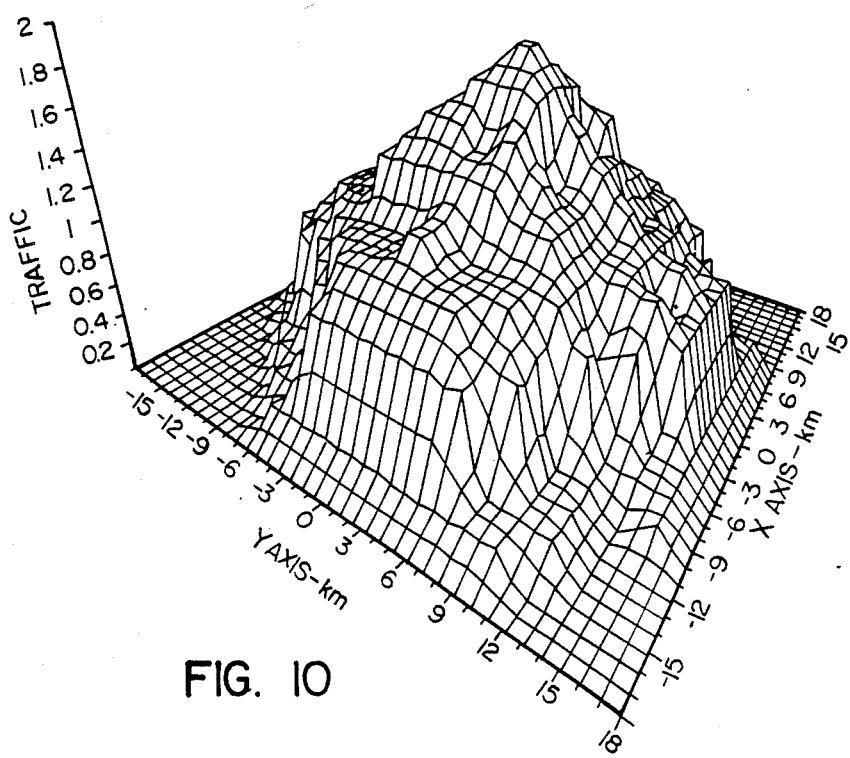
FIG. 10 is a 3-dimensional graphical illustration of a typical mobile traffic density used in a simulation of the system shown in FIG. 1.

For purposes of the simulation which was conducted, mobile transceivers were assumed to have Gaussian distributed velocities with means that vary according to specific sectors of the service area. Mobile transceivers were assumed to travel in the small cell C1 with an average velocity of 30 kilometers per hour with a standard deviation of 20 kilometers per hour. In the peripheral cells (e.g., cell C9), mobile transceivers were assumed to have an average speed of 90 kilometers per hour with a standard deviation of 30 kilometers per hour. Mobile traffic distribution, an important factor for the design of cellular systems, is usually highly concentrated within certain sectors of the service area (which often centers around a major metropolitan area). FIG. 10 is a 3-dimensional depiction of mobile traffic density used for purposes of the simulation.

Figure 11:
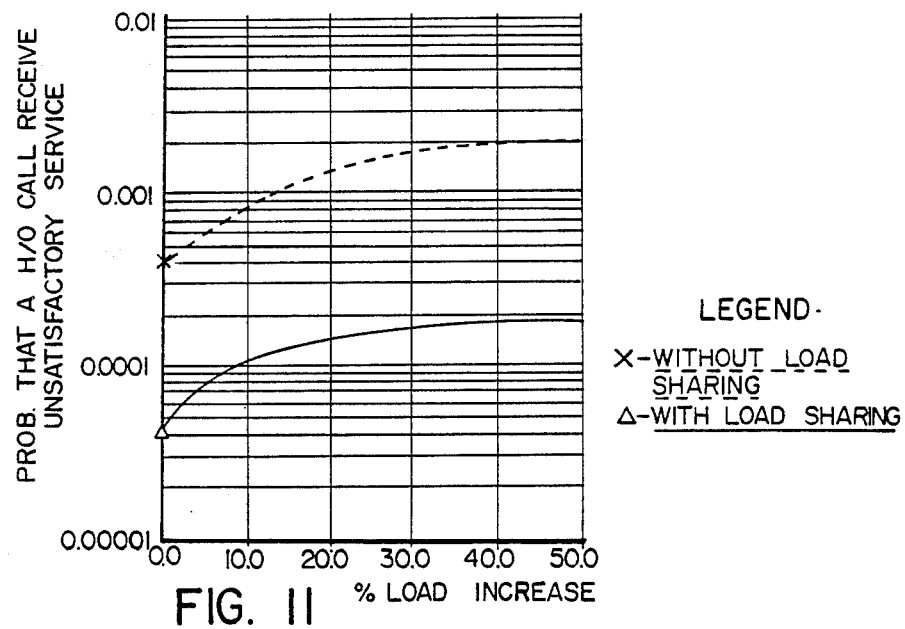
FIG. 11 is a graphical illustration of the probability that a call hand-off receives unsatisfactory service plotted against percent load increase of the system shown in FIG. 1 with and without load balancing in accordance with the present invention.
Figure 12:
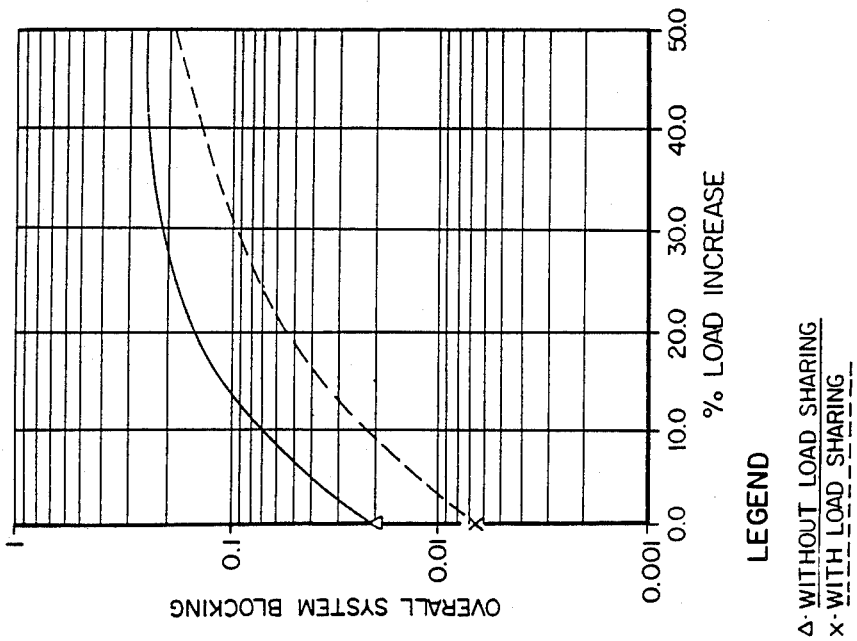
FIG. 12 is a graphical illustration of overall blocking perceived by mobile transceivers in the system shown in FIG. 1 with respect to system overload with and without load balancing in accordance with the present invention.

The improvement of hand-off performance provided by dynamic load balancing in accordance with the present invention is illustrated in FIG. 11, which shows the probability of a mobile transceiver receiving unsatisfactory hand-off service (RSSI below −97 dBm) with respect to percentage overload in system traffic. FIG. 12 is a graphical illustration of overall system blocking perceived by mobile transceiver users as a function of percent traffic overload on the system with and without load balancing in accordance with the present invention. Both of these graphs show that load balancing in accordance with the present invention provides much lower system blocking and results in a 10 to 20% increase in system traffic handling capacity.

Figure 13:
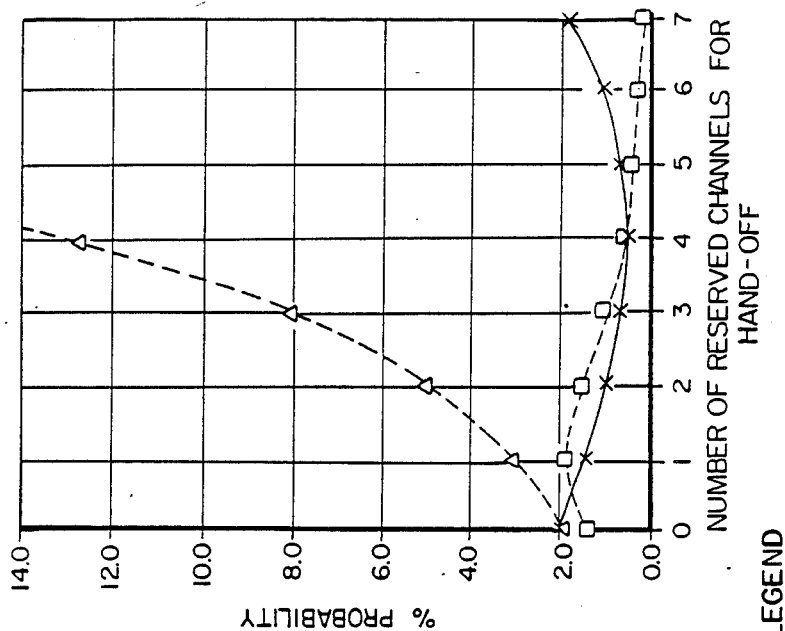
FIG. 13 is a graphical illustration of probability that a hand-off attempt must wait for a free RF channel, overall system blocking perceived by mobile transceivers, and average cell blocking with respect to the number of channels reserved for hand-off in the system shown in FIG. 2.

The effect of reserving RF channels is illustrated in FIG. 13, where the following parameters are plotted against the number of RF channels reserved for hand-offs: (1) probability that a hand-off attempt has to wait for a free RF channel; (2) overall system blocking perceived by mobile transceiver users; and (3) average cell blocking for calls in a particular cell. As the number of reserved RF channels is increased (by decreasing the DRTHRESH and DHTHRESH values discussed previously), the blocking on first choice cells increases but overall system blocking is much lower. As the number of reserved channels increases, the blocking of calls within a particular cell increases. However, the overall system blocking curve exhibits a minimum so that the number of reserved channels can be chosen to minimize overall system blocking. The probability that a hand-off attempt directed to a cell must wait for a free channel decreases with an increase in number of reserved channels. In accordance with the present invention, the DRTHRESH and DHTHRESH values may be varied on a cell-by-cell basis according to user specifications, and may be dynamically varied according to system loading if desired. The DRTHRESH and DHTHRESH may be optimized according to statistical information gathered by system 10 during actual operation.

A load balancing technique for use in a cellular mobile radio telephone system has been described which causes the system to behave as an alternative routing or progressive grading system with an increased effective traffic-handling capacity of about 10–20%. Load balancing in accordance with the present invention ensures a negligible probability of call cut-off due to unsuccessful hand-offs without increasing system cost or the number of channels allocated to the system. Although only one embodiment of the invention has been described, person skilled in the art will appreciate the many modifications that may be made. For example, although cells have been described as being capable of entering four possible states (normal, directed hand-off, directed retry and combined), only two of these two states (normal and directed hand-off) are necessary for load balancing to be effective. Hence, the DRTHRESH value may be set to an extremely high value if desired to prevent cells from entering the directed retry or combined modes, and the system will still produce very satisfactory results. Additional reduction in message transfers may be possible while accomplishing the same functions. Moreover, load balancing in accordance with the present invention is not limited to land-to-mobile cellular radio telephone communications systems, but can be used in any alternative trunk routing arrangement in which some trunks may be overloaded while others may be only lightly loaded. Therefore, while the invention has been described with reference to a particular preferred embodiment, it is to be understood that modifications may be made without departing from the spirit of the invention or from the scope of the

What is claimed is:

1. A method of communicating with mobile radio transceivers including the steps of:
   (1) establishing communications between mobile radio transceivers located within a first predetermined geographical area and a first plurality of stationary transceivers serving said first area;
   (2) determining a channel occupancy level associated with said first geographical area indicating the number of said first plurality of stationary transceivers which are in communication with mobile radio transceivers with respect to the number of said first plurality of stationary transceivers not in communication with mobile transceivers; and
   (3) if said channel occupancy level determined by said determining step (2) exceeds a predetermined threshold level, transferring an ongoing communication with a selected mobile transceiver from a stationary transceiver serving said first area to a further stationary radio transceiver serving a further predetermined geographical area distinct from and overlapping said first area and also containing the selected mobile transceiver.

2. In a cellular mobile radio telephone communications system of the type including plural geographically-separated radio base stations serving corresponding plural discrete geographical cells, adjacent ones of said cells overlapping one another, each of said base stations including radio transceiver means for communicating over a prespecified plurality of voice communications channels allocated to the cell served thereby simultaneously and independently with a corresponding plurality of mobile radio transceivers located within the cell, an improvement comprising:

determining, for at least one cell, a voice channel occupancy level indicating the number of voice communications channels allocated thereto being used for communications with respect to the total number of voice channels allocated thereto;

comparing said determined voice channel occupancy level of said cell with a predetermined threshold level; and if said comparison reveals the voice channel occupancy level of said cell exceeds said threshold level, transferring communications from the base station serving the cell to the base station serving an adjacent cell.

3. A central controller adapted for communicating control signals to/from plural stationary geographically-separated radio transceivers, said plural stationary transceivers of the type serving respective corresponding overlapping geographical areas and communicating radio signals to/from mobile radio transceivers located in said areas over radio communications channels preallocated thereto, said central controller including a digital signal processor connected to communicate said control signals and programmed so as to perform the following functions:

monitor the number of radio communications channels being used for communications by each of said plural stationary transceivers;

determine, for each stationary transceiver, a measure of the number of communications channels being used for communications with respect to the number of communications channels preallocated thereto; and control stationary transceivers having high determined measures to shift communications to stationary transceivers having low determined measures and serving geographically-neighboring areas.

4. In a cellular mobile radiotelephone communications system of the type including plural stationary geographically-separated radio transceiving stations serving corresponding discrete geographical areas, adjacent ones of said areas overlapping one another, said system further including plural mobile radio transceivers communicating radio signals with the stationary transceiving stations serving areas said mobile radio transceivers are located within, an improvement comprising:

means for determining, for each stationary transceiving station, an indication of the instantaneous capacity of the transceiving station to communicate radio signals with additional mobile radio transceivers independently of the radio signals said transceiving station is already communicating with mobile radio transceivers; and control means, operatively connected to said plural stationary transceiving stations and to said determining means, for controlling stationary transceiving stations with low determined instantaneous capacities to terminate communications with selected mobile radio transceivers located at positions also served by further stationary transceiving stations having high determined instantaneous capacities and for controlling said further stationary transceiving stations to communicate with said selected mobile radio transceivers.

5. In a cellular radiotelephone communications system of the type including first and second geographically-separated stationary radio transceivers, said first stationary transceiver for communicating radio signals over a first plurality of communications channels preallocated thereto with physically-distinct mobile radio transceivers located in a first geographical area, said second stationary transceiver for communicating radio signals over a second plurality of communications channels preallocated thereto with physically-distinct mobile radio transceivers located in a second geographical area, said first and second geographical areas overlapping one another, an improvement comprising a method of balancing the relative loading of said first and second stationary transceivers comprising the steps of:

(1) determining the number of said first plurality of channels being used for communicating signals between said first stationary transceiver and said mobile radio transceivers;

(2) determining the number of said second plurality of channels being used for communicating signals between said second stationary transceiver and said mobile radio transceivers; and (3) if said first-mentioned number exceeds a first predetermined threshold associated with said first stationary transceiver and said second-mentioned number is less than a second predetermined threshold associated with said second stationary transceiver, directing a selected mobile transceiver located in both said first and second geographical areas and tuned to one of said first plurality of channels to retune to one of said second plurality of channels and begin communicating radio signals with said second stationary transceiver.

6. A method as in claim 5 further including the step of:

(4) if said first-mentioned number is less than said first predetermined threshold and said second-mentioned number exceeds said second predetermined threshold, directing a selected mobile transceiver located in both said first and second geographical areas and tuned to one of said second plurality of channels to retune to one of said first plurality of channels and begin communicating radio signals with said first stationary transceiver.

7. A method as in claim 5 wherein:

said method further includes the step of repeating said determining steps (1) and (2) periodically; and said directing step (3) includes the steps of:

(a) periodically comparing said first-mentioned number with said first threshold, (b) setting the value of a first state variable associated with said first stationary transceiver to a normal state whenever said comparing step (a) reveals said first-mentioned number is less than said first threshold, (c) setting the value of said first state variable to a directed hand-off state whenever said comparing step (a) reveals said first-mentioned number exceeds said first threshold, (d) periodically comparing said second-mentioned number to said second threshold, (e) setting the value of a second state variable associated with said second stationary transceiver to said normal state whenever said comparing step (d) reveals said second-mentioned number is less than said second threshold, (f) setting the value of said second state variable to said directed hand-off state whenever said comparing step (d) reveals said second-mentioned number exceeds said second threshold, (g) whenever the values of said first and second state variables are unequal, testing whether any mobile transceiver tuned to a channel preallocated to the one of said first and second stationary transceivers associated with a state variable having a directed hand-off value is located in both of said first and second geographical areas, and (h) if said testing reveals at least one mobile transceiver is located in both said geographical areas, directing said one mobile transceiver to retune to a communications channel preallocated to the stationary transceiver associated with the state variable having a normal value.

8. A method as in claim 5 further including the steps of:

(a) measuring the RSSI value at said first stationary transceiver of radio signals transmitted by each of said mobile transceivers tuned to one of said first plurality of channels;

(b) determining if any of said measured RSSI values is less than a predetermined first RSSI threshold associated with said first stationary transceiver;

(c) if said determining step (b) reveals a mobile transceiver transmitting signals having an RSSI value which is less than said predetermined RSSI threshold, measuring the RSSI value of radio signals transmitted by said mobile transceiver and received by said second stationary transceiver; and (d) if said RSSI value measured by said measuring step (c) exceeds a second predetermined RSSI threshold associated with said second stationary transceiver, directing said mobile transceiver to retune to one of said second plurality of channels and begin communicating radio signals with said second stationary transceiver.

9. A method as in claim 8 further including the steps of:

(a') measuring the RSSI value at said second stationary transceiver of radio signals transmitted by each of said mobile transceivers tuned to one of said second plurality of channels;

(b') determining whether any of said RSSI values measured by said measuring step (a') is less than a predetermined first RSSI value associated with said second stationary transceiver;

(c') if said determining step (b') reveals a mobile transceiver transmitting signals having an RSSI value which is less than said predetermined RSSI value, measuring the RSSI value of radio signals transmitted by said mobile transceiver and received by said first stationary transceiver; and (d') if said RSSI value measured by said measuring step (c') exceeds a second predetermined RSSI value associated with said first stationary transceiver, directing said mobile transceiver to retune to one of said first plurality of channels and begin communicating radio signals with said first stationary transceiver.

10. A method as in claim 6 further including the steps of:

(5) initiating communication of radio signals between said first stationary transceiver and additional mobile transceivers located within said first area over unused ones of said first plurality of channels;

(6) initiating communication of radio signals between said second stationary transceiver and mobile transceivers located within said second area over unused ones of said second plurality of channels;

(7) if said first-mentioned number exceeds a third predetermined threshold greater than said first threshold, inhibiting said initiating step (4) but not said directing step (3); and (8) if said second-mentioned portion exceeds a fourth predetermined threshold greater than said second threshold, inhibiting said initiating step (5) but not said directing step (3).

11. A method as in claim 5 wherein said directing step (3) includes the steps of:

(a) measuring a first RSSI value indicating the amplitude of radio signals transmitted by said selected mobile transceiver and received by said first stationary transceiver;

(b) measuring a second RSSI value indicating the amplitude of radio signals transmitted by said selected mobile transceiver and received by said second stationary transceiver;

(c) determining the difference between said first measured RSSI value and a first preprogrammed absolute RSSI value associated with said first stationary transceiver;

(d) determining the difference between said second measured RSSI value and a second preprogrammed absolute RSSI value associated with said second stationary transceiver; and (e) if said first-mentioned difference is less than said second-mentioned difference, said first-mentioned number exceeds said first predetermined threshold and said second-mentioned number is less than said second predetermined threshold, directing said selected mobile transceiver to retune to one of said second plurality of channels and begin communicating radio signals with said second stationary transceiver.

12. A method as in claim 11 wherein: said method further includes the steps of:

(c1) calculating a threshold modifier value in response to said first measured RSSI value, said first and second preprogrammed RSSI values, and a further preset threshold delta factor associated with said first stationary transceiver, (c2) modifying said second threshold value with said calculated threshold modifier to obtain an adjusted threshold value, and (c3) comparing said second measured RSSI value with said adjusted threshold value and with said second preprogrammed absolute RSSI value; and said directing step (e) only directs said selected mobile transceiver to retune to one of said second plurality of channels if said comparison reveals said second measured RSSI value exceeds both said adjusted threshold value and said second preprogrammed absolute threshold value.

13. A method as in claim 5 further including the step of repeating said directing step (3) for additional selected mobile transceivers located within both said first and second areas until said first-mentioned number is less than said first threshold.

14. A method as in claim 5 wherein said directing step (3) further includes the steps of:

measuring the RSSI value of radio signals transmitted by mobile transceivers communicating signals with said first stationary transceiver over said first plurality of channels and received by said first stationary transceiver; and selecting the mobile transceiver located in both said first and second areas and transmitting radio signals having the weakest measured RSSI value.

15. In a cellular radiotelephone communications system of the type including first and second geographically-separated stationary radio transceivers, said first stationary transceiver for communicating radio signals over a first plurality of radio communications channels preallocated thereto with physically-distinct mobile radio transceivers located in a first geographical area, said second stationary transceiver for communicating radio signals over a second plurality of communications channels preallocated thereto with physically-distinct mobile radio transceivers located in a second geographical area, said first and second geographical areas overlapping one another, a controller means connected to transmit control signals to and receive control signals from said first and second stationary radio transceivers, said controller means for:

(1) determining the number of said first plurality of channels being used for communicating signals between said first stationary transceiver and mobile radio transceivers, (2) determining the number of said second plurality of channels being used for communicating signals between said second stationary transceiver and mobile radio transceivers, and (3) directing a selected mobile transceiver located in both said first and second geographical areas and tuned to one of said first plurality of channels to retune to one of said second plurality of channels and begin communicating radio signals with said second stationary transceiver if said first-mentioned number exceeds a first predetermined threshold associated with said first stationary transceiver and said second-mentioned number is less than a second predetermined threshold associated with said second stationary transceiver.

16. A system as in claim 15 wherein said controller means also directs a selected mobile transceiver located in both said first and second geographical areas and tuned to one of said second plurality of channels to retune to one of said first plurality of channels and begin communicating radio signals with said first stationary transceiver if said first-mentioned number is less than said first threshold and said second-mentioned number exceeds said second threshold.

17. A system as in claim 15 wherein said controller means includes a digital signal processor preprogrammed to perform the following functions:

(a) periodically determine said first-mentioned and second-mentioned numbers;

(b) periodically compare said first-mentioned number with said first threshold;

(c) set the value of a first state variable associated with said first stationary transceiver to a normal state whenever said comparison reveals said first-mentioned number is less than said first threshold;

(d) set the value of said first state variable to a directed hand-off state whenever said comparison reveals said first-mentioned number exceeds said first threshold;

(e) periodically further compare said second-mentioned portion with said second threshold;

(f) set the value of a second state variable associated with said second stationary transceiver to said normal state whenever said further comparison reveals said second-mentioned number is less than said second threshold;

(g) set the value of said second state variable to said directed hand-off state whenever said further comparison reveals said second-mentioned number exceeds said second threshold;

(h) test whether any mobile radio transceiver communicating with the one of said first and second stationary transceivers associated with a state variable having a directed hand-off value is in both said first and second geographical areas whenever the values of said first and second state variables are unequal; and (i) direct a mobile transceiver revealed by said test to be in both areas to retune to communications channels preallocated to the stationary transceiver associated with the state variable having a normal value.

18. A system as in claim 15 wherein:

said first stationary transceiver includes means for measuring the RSSI value of radio signals transmitted by each of said mobile transceivers communicating with said first stationary transceiver and received by said first stationary transceiver;

said second stationary transceiver includes means for measuring the RSSI value of signals transmitted by a selected mobile transceiver and received by said second stationary transceiver; and said controller means includes a digital signal processor preprogrammed to perform the following further functions:

(a) determine if any RSSI value measured by said first stationary transceiver RSSI measuring means is less than a predetermined first RSSI value;

(b) control said second stationary transceiver measuring means to measure the RSSI value of signals transmitted by mobile transceivers revealed by said determination to be transmitting signals having an RSSI value less than said predetermined first RSSI value as measured by said first stationary transceiver measuring means; and (c) direct said mobile transceiver to retune to a communication channel preallocated to said second stationary transceiver if said RSSI value measured by said second stationary transceiver measuring means exceeds a predetermined second RSSI value associated with said second stationary transceiver.

19. A system as in claim 15 wherein said controller means includes a digital signal processor preprogrammed to perform the following functions:

control said first stationary transceiver to initiate communication of radio signals with additional mobile transceivers located within said first geographical area over unused ones of said first plurality of channels;

control said second stationary transceiver to initiate communication of radio signals with additional mobile transceivers located within said second geographical area over unused ones of said second plurality of channels;

inhibit said first-mentioned control function while continuing to redirect communications of said selected mobile transceiver if said first-mentioned number exceeds said first predetermined threshold and said second-mentioned number is less than said second predetermined threshold whenever said first-mentioned number is exceeds a third predetermined threshold greater than said first predetermined threshold; and inhibit said second-mentioned control function while continuing to redirect the communications of said selected mobile transceiver whenever said second-mentioned number exceeds a fourth predetermined threshold greater than said second predetermined threshold.

20. A system as in claim 15 wherein:

said first stationary transceiver includes means for measuring a first RSSI value for radio signals transmitted by said selected mobile transceiver and received by said first stationary transceiver;

said second stationary transceiver includes means for measuring a second RSSI value for radio signals transmitted by said selected mobile transceiver and received by said second stationary transceiver; and said controller means includes a digital signal processor connected to receive said first and second measured RSSI values and preprogrammed to perform the following functions:
  (a) determine the difference between said first measured RSSI value and a first preprogrammed absolute RSSI value associated with said first stationary transceiver,
  (b) determine the difference between said second RSSI value and a second preprogrammed absolute RSSI value associated with said second stationary transceiver, and
  (c) direct said selected mobile transceiver to retune to a communication channel allocated to said second stationary transceiver if said first-mentioned difference is less than said second-mentioned difference, said first-mentioned number exceeds said first predetermined threshold, and said second-mentioned portion is less than said second predetermined threshold.

21. A system as in claim 20 wherein said digital signal processor is preprogrammed to perform the following further functions:
  (c1) calculate a threshold modifier value in response to said first measured RSSI value, said first and second threshold values and a further preset threshold delta factor associated with said first stationary transceiver,
  (c2) modify said second threshold value with said calculated threshold modifier to obtain an adjusted threshold value,
  (c3) compare said second measured RSSI value with said adjusted RSSI value and with said second absolute RSSI value, and
  (c4) condition said directing function (c) on said second measured RSSI value exceeding both said adjusted threshold value and said second absolute RSSI value.

22. A system as in claim 15 wherein said controller means directs additional selected mobile transceivers to retune to communications channels preallocated to said second stationary transceiver until said first-mentioned number is less than said first threshold and/or until said second-mentioned number will exceed said second threshold if a further mobile transceiver is so directed.

23. A system as in claim 15 wherein said first stationary transceiver includes:

means for measuring the RSSI value of radio signals transmitted by a mobile transceiver tuned to one of said first plurality of channels; and means for selecting said mobile transceiver in response to measured RSSI values.

24. A system as in claim 23 wherein said selecting means includes means for choosing the mobile transceiver transmitting radio signals having the weakest measured RSSI value.

25. In a cellular radiotelephone communications system of the type including first and second geographically-separated stationary radio transceivers, said first stationary transceiver for transmitting radio signals over a first plurality of radio communications channels preallocated thereto to a first geographical area and for receiving radio signals transmitted over said first plurality of channels, said second stationary transceiver for transmitting radio signals over a second plurality of radio communications channels preallocated thereto and for receiving radio signals transmitted over said second plurality of channels, a mobile radio transceiver located in both said first and second geographical areas and including:

tunable transceiving means for transmitting and receiving radio signals over a radio communications channel;

tuning means connected to said transceiving means for tuning said transceiving means to one of said first plurality of channels; and control means connected to said tuning means for controlling said tuning means to retune said transceiving means to one of said second plurality of channels if a measure of the number of said first plurality of communications channels being used by said first stationary transceiver for transmitting/receiving radio signals exceeds a predetermined threshold and the number of said second plurality of communications channels being used by said second stationary transceiver for transmitting/receiving radio signals is less than said predetermined threshold.

* * * * *